(12) United States Patent
Ochiai et al.

(10) Patent No.: US 7,085,763 B2
(45) Date of Patent: Aug. 1, 2006

(54) DEVICE SEARCH SYSTEM

(75) Inventors: Masato Ochiai, Yokohama (JP);
Yoshito Maekawa, Yokohama (JP);
Noboru Hamada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 84 days.

(21) Appl. No.: 09/552,589

(22) Filed: Apr. 19, 2000

(65) Prior Publication Data

US 2003/0115199 A1 Jun. 19, 2003

(30) Foreign Application Priority Data

Apr. 27, 1999 (JP) ................................. 11-119624
May 31, 1999 (JP) ................................. 11-151901
Sep. 17, 1999 (JP) ................................. 11-264450

(51) Int. Cl.
*G06F 7/00* (2006.01)
(52) U.S. Cl. ..................... 707/10; 707/3; 707/4; 707/5; 709/220; 709/226
(58) Field of Classification Search ................. 707/10, 707/100, 3–5; 358/1.9, 1.15, 1.16; 709/220, 709/221, 223, 224, 226
See application file for complete search history.

(56) References Cited

U.S. PATENT DOCUMENTS

| | | | | |
|---|---|---|---|---|
| 4,727,487 A | * | 2/1988 | Masui et al. ................... 706/57 |
| 5,129,639 A | * | 7/1992 | DeHority .................... 270/1.01 |
| 5,201,047 A | * | 4/1993 | Maki et al. ..................... 707/4 |
| 5,261,044 A | * | 11/1993 | Dev et al. ..................... 345/775 |
| 5,511,208 A | * | 4/1996 | Boyles et al. ................. 707/10 |
| 5,559,933 A | * | 9/1996 | Boswell ...................... 358/1.15 |
| 5,625,757 A | * | 4/1997 | Kageyama et al. ......... 358/1.14 |
| 5,659,795 A | * | 8/1997 | Duvall et al. ................. 710/15 |
| 5,715,444 A | * | 2/1998 | Danish et al. .................. 707/4 |
| 5,765,154 A | * | 6/1998 | Horikiri et al. ................ 707/10 |
| 5,778,185 A | * | 7/1998 | Gregerson et al. .......... 709/226 |
| 5,870,741 A | * | 2/1999 | Kawabe et al. ................. 707/5 |
| 5,872,569 A | * | 2/1999 | Salgado et al. ............. 345/764 |
| 6,026,403 A | * | 2/2000 | Siefert .......................... 705/27 |
| 6,073,130 A | * | 6/2000 | Jacobson et al. ............... 707/5 |
| 6,076,106 A | * | 6/2000 | Hamner et al. .............. 709/223 |
| 6,088,120 A | * | 7/2000 | Shibusawa et al. ........ 358/1.15 |
| 6,101,498 A | * | 8/2000 | Scaer et al. ................... 707/10 |
| 6,166,826 A | * | 12/2000 | Yokoyama ................. 358/1.16 |

(Continued)

FOREIGN PATENT DOCUMENTS

JP       05028088 A  *  2/1993

(Continued)

OTHER PUBLICATIONS

Doan, Khoa et al., Query Previews in Networked Information Systmes, IEEE, Apr. 1996.*

(Continued)

*Primary Examiner*—Kim Vu
*Assistant Examiner*—Thomas Gyorfi
(74) *Attorney, Agent, or Firm*—Fitzpatrick, Cella, Harper & Scinto

(57) ABSTRACT

According to the present invention, a search condition can be moderated to easily understand a desired device without performing re-search, even if there is no device completely matching the search condition. An attribute of an object class is extracted out of the search condition designated by an operator to search a device meeting the attribute. A matching state of each attribute of the search condition first designated by the operator for a result obtained from the above search is visibly displayed.

54 Claims, 19 Drawing Sheets

| DEVICE NAME | NETWORK ADDRESS | OBJECT CLASS | DEVICE TYPE | COLOR PRINT | DOUBLE-SIDED PRINT | STAPLE | ... |
|---|---|---|---|---|---|---|---|
| Mr. COLOR | 192.168.16.131 | printer | printer | 1 | 0 | 1 | ... |
| SECOND FLOOR HIGH SPEED MACHINE | 192.168.16.132 | printer | MPF | 0 | 1 | 1 | ... |
| DEVELOPMENT ROOM PRINTER | 192.168.16.155 | printer | printer | 0 | 0 | 1 | ... |
| FIRST FLOOR PRINTER | 192.168.16.156 | printer | printer | 0 | 1 | 0 | ... |
| SCAN | 192.168.16.32 | scanner | scanner | NA | NA | NA | ... |
| ... | ... | ... | ... | ... | ... | ... | ... |

Column labels: 301, 302, 303, 304, 305, 306, 307 (table 300)

U.S. PATENT DOCUMENTS

| | | | |
|---|---|---|---|
| 6,182,083 B1 * | 1/2001 | Scheifler et al. | 707/103 R |
| 6,198,542 B1 | 3/2001 | Tabata | 358/1.15 |
| 6,272,500 B1 * | 8/2001 | Sugita | 707/103 R |
| 6,292,829 B1 * | 9/2001 | Huang et al. | 709/223 |
| 6,295,527 B1 * | 9/2001 | McCormack et al. | 707/3 |
| 6,330,565 B1 * | 12/2001 | Nesbitt | 707/103 R |
| 6,332,142 B1 * | 12/2001 | LeBlanc | 707/100 |
| 6,335,795 B1 * | 1/2002 | Neuhard et al. | 358/1.15 |
| 6,348,971 B1 * | 2/2002 | Owa et al. | 358/1.15 |
| 6,366,904 B1 * | 4/2002 | BenHadda et al. | 707/3 |
| 6,470,332 B1 * | 10/2002 | Weschler | 707/3 |
| 6,553,368 B1 * | 4/2003 | Martin et al. | 707/3 |

FOREIGN PATENT DOCUMENTS

| | | | |
|---|---|---|---|
| JP | 06-161685 | | 6/1994 |
| JP | 07-021193 | | 1/1995 |
| JP | 07-302267 | | 11/1995 |
| JP | 07302267 A | * | 11/1995 |
| JP | 09-114615 | | 5/1997 |
| JP | 09-128174 | | 5/1997 |
| JP | 09-198206 | | 7/1997 |
| JP | 11346216 A | * | 12/1999 |

OTHER PUBLICATIONS

Yeong et al., Lightweight Directory Access Protocol, RFC 1777.*

Wills, Craig et al., Resource-Driven Resource Location, IEEE 1993.*

Susan Gauch, John B. Smith, Search improvement via automatic query reformulation, ACM Transactions on Information Systems (TOIS), v.9 n.3, p. 249-280, Jul. 1991.*

U.S. Appl. No. 09/576,245, filed May 24, 2000.

* cited by examiner

FIG. 3

| DEVICE NAME | NETWORK ADDRESS | OBJECT CLASS | DEVICE TYPE | COLOR PRINT | DOUBLE-SIDED PRINT | STAPLE | ... |
|---|---|---|---|---|---|---|---|
| Mr. COLOR | 192.168.16.131 | printer | printer | 1 | 0 | 1 | ... |
| SECOND FLOOR HIGH SPEED MACHINE | 192.168.16.132 | printer | MPF | 0 | 1 | 1 | ... |
| DEVELOPMENT ROOM PRINTER | 192.168.16.155 | printer | printer | 0 | 0 | 1 | ... |
| FIRST FLOOR PRINTER | 192.168.16.156 | printer | printer | 0 | 1 | 0 | ... |
| SCAN | 192.168.16.32 | scanner | scanner | NA | NA | NA | ... |
| ... | ... | ... | ... | ... | ... | ... | ... |

| SEARCH RESULT | | | | | | |
|---|---|---|---|---|---|---|
| | 801 | 802 | 803 | 804 | 805 | 806 |
| | DEVICE NAME | NETWORK ADDRESS | DEVICE TYPE | COLOR PRINT | DOUBLE-SIDED PRINT | STAPLE |
| | Mr. COLOR | 192.168.16.131 | printer | 1 | 0 | 1 |
| | SECOND FLOOR HIGH SPEED MACHINE | 192.168.16.132 | MPF | 0 | 1 | 1 |
| | DEVELOPMENT ROOM PRINTER | 192.168.16.155 | printer | 0 | 0 | 1 |
| | FIRST FLOOR PRINTER | 192.168.16.156 | printer | 0 | 1 | 0 |

FIG. 12

| CLASS PRINTER ▼ | | SEARCH | | | | |
|---|---|---|---|---|---|---|
| NAME | IP ADDRESS | | ■COLOR | ■STAPLE | ■DOUBLE-SIDED PRINT | □SORTER |
| Mr. COLOR | 192.168.16.131 | | ○ | ○ | — | |
| SECOND FLOOR HIGH SPEED MACHINE | 192.168.16.132 | | — | ○ | ○ | |
| DEVELOPMENT ROOM PRINTER | 192.168.16.155 | | — | ○ | — | |
| FIRST FLOOR PRINTER | 192.168.16.156 | | — | — | ○ | |

600, 601, 602, 603, 603a, 603b, 603c, 603d, 604, 604a, 604b, 604c, 604d, 604e, 604f

DEVICE SEARCH SYSTEM

BACKGROUND OF THE INVENTION

1. Field of the Invention

The present invention relates to a system for searching a device on a network.

2. Related Background Art

Directly service has been provided so far as a method for efficiently finding various resources (including a printer and a scanner) on a network to use them. The directory service is, so to speak, a telephone directory for a network, which is used to store various pieces of information. LDAP (Lightweight Directory Access Protocol) is a specific example of a directory system. LDAP rules is described in RFC 1777 issued by IETF. By using the directory service and thereby searching a device connected to a network, it is possible to obtain a list of network addresses of devices usable on the network.

In the case of the above conventional art, however, when designating various attributes to search a device or when designating various attributes such as presence or absence of a staple function or presence or absence of double-sided screen print and searching a device by using a network printer, only a device completely matching with search conditions including these attributes is searched and shown to a user.

Therefore, when a device completely matching with input search conditions is not present on a network, a problem occurs that re-search must be performed by re-inputting search conditions in which designation of attributes is moderated. Moreover, when a device completely matching with search conditions is not present in re-search, a problem occurs that it is necessary to perform search again by re-inputting search conditions in which designation of attributes is further moderated.

SUMMARY OF THE INVENTION

The present invention is made to solve the above problems and it is an object of the present invention to make it possible that when searching a device by designating various attributes as search conditions, a user can save the time for re-searching a desired device by re-inputting search conditions not only when a device completely matching with the search conditions is present on a network but also when the device is not present on the network.

Moreover, it is another object of the present invention to make it possible for a user to easily understand whether a displayed device meets any attribute when the search result is displayed.

To achieve the above objects, an embodiment of the present invention extracts an object-class attribute out of search conditions designated by an operator and searches a device meeting the attribute and performs a process on whether the device obtained through the search has attributes of search conditions first designated by the operator.

Other objects and features of the present invention will become more apparent from the following specification and drawings.

BRIEF DESCRIPTION OF THE DRAWINGS

FIG. 3 is an illustration showing an example of device information in a device search server;

FIG. 12 is an illustration showing indications on a device search screen after device search;

DESCRIPTION OF THE PREFERRED EMBODIMENTS

Embodiments of the present invention are described below by referring to the accompanying drawings.

<First Embodiment>

Figure 1:
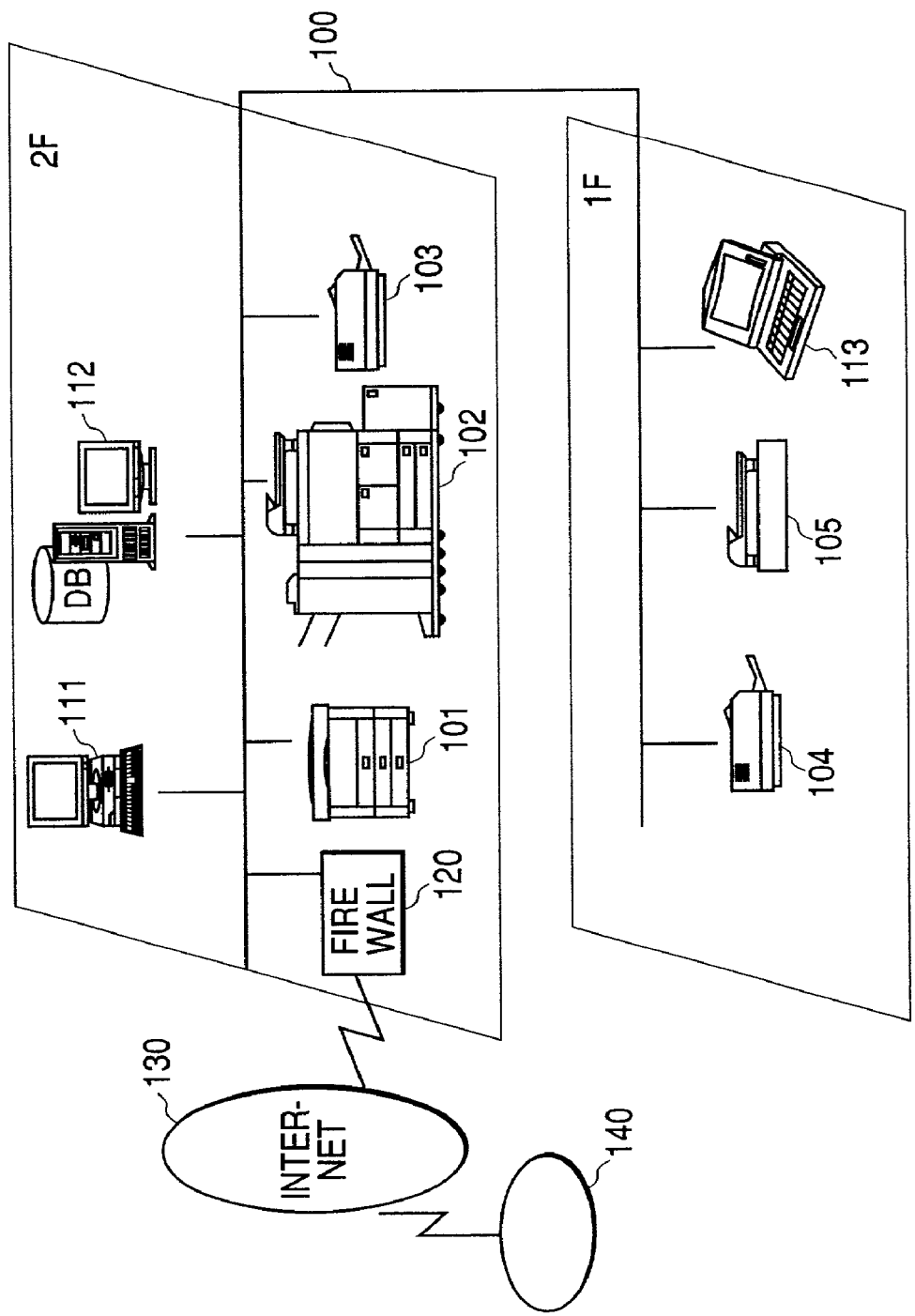
FIG. 1 is an illustration showing a configuration of a network in which the device search system of this embodiment can operate.

FIG. 1 is an illustration showing a configuration of a network in which a device search system of this embodiment can operate. In FIG. 1, symbol 101 denotes a color printer, 102 denotes an MFP (Multi Function Peripheral: a copying machine also serving as a network printer), 103 and 104 denote monochromatic printers, and 105 denotes a scanner connected with a network. Symbol 111 denotes a desk-top-type computer (hereafter referred to as PC) and 113 denotes a notebook-type computer (hereafter referred to as notebook PC). These PCs can respectively execute a program of a device search server of this embodiment and they respectively output a device search request meeting a desired condition to a device search server as described later, receive a search result, and display the result on a display screen. Hereafter, a PC 111 and a notebook PC 113 capable of executing the program of the device search client are referred to as device search clients 111 and 113. Symbol 112 denotes a PC capable of executing a program of the device search client server of this embodiment, which stores information (database) for network devices 101 to 106 to be described later, receives an inquiry about device search from the device search client 111 or 113, and returns a result of the inquiry. Hereafter, a PC 112 capable of executing a program of the device search server is referred to as device search server 112.

Among the above devices, 101, 102, 103, 111, 112, and 120 are set on the second floor and 104 and 105 are set on the first floor. Because the client 113 is a notebook PC, it is connected to LAN 100 from the first floor at present. However, the client 113 may be removed because of its portability. Moreover, the network 100 for connecting these devices to each other is connected to Internet 130 through a fire wall 120 and moreover connected with other network 140 through Internet 130.

Figure 2:
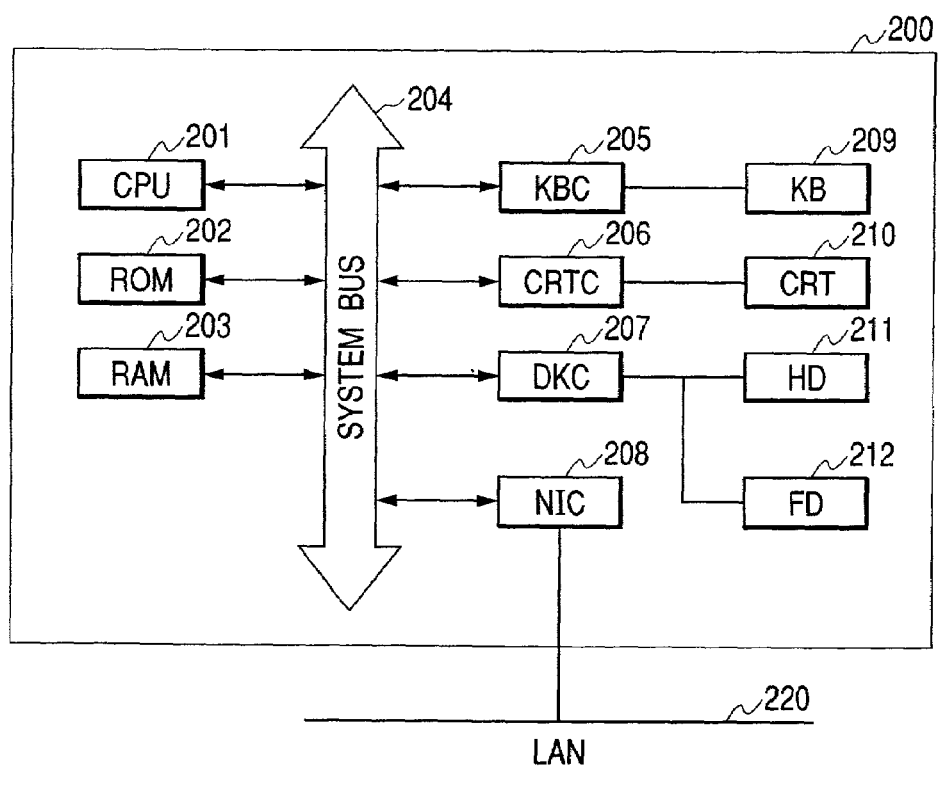
FIG. 2 is a block diagram showing a configuration of device search server and a device search client.

FIG. 2 is a block diagram showing a configuration of the search clients 111 and 113 and the search server 112, which comprises the same configuration as a general purpose personal computer. In FIG. 2, symbol 200 denotes the whole PC in which either of device search client software and device search server software (hereafter, they are referred to as device search software) works and the PC 200 is equivalent to 111, 112, or 113. The PC 200 is provided with a CPU 201 for executing device search software stored in a hard disk (HD) 211 or supplied from a floppy disk drive (FD) 212 to generally control each device connected to a system bus 204. Symbol 203 denotes a RAM that functions as a main memory or a work area of the CPU 201. Symbol 205 denotes a keyboard controller (KBC) to control an instruction input from a keyboard (KB) 209 or not-illustrated bonding device. Symbol 206 denotes a CRT controller (CRTC) to control indications on a CRT display (CRT) 210. Symbol 207 denotes a disk controller (DKC) to control the access with the hard disk (HD) 211 and floppy disk controller (FD) 212 for storing a boot program, various applications, an edition file, a user file, and a network control program. Symbol 208 denotes a network interface card (NIC) to bidirectionally transfer data to and from a network printer, other network unit, or other PC through a LAN 220. The LAN 220 is the same as the LAN 100 in FIG. 1.

Then, a configuration and operations of a device search server are described below.

FIG. 3 is an illustration showing a structure of a database for a network unit stored in the search server 112.

In the table in FIG. 3, each row denotes a network device. Each column denotes a device name (301), a network address (302) of a printer, an object class (303) showing a functional type of a device, a device type (304), whether to support color print (305), whether to support double-sided print (306), or whether to support a staple (307).

In this case, an object class shows a functional type of a device. For example, when a device is a printer, it is registered as a printer class (printer). Moreover, when a device has a print function, it can be registered as a printer-class device even if the device is an MFP. Furthermore, a device type shows the general function of a device. In this case, a single printer is distinguished from an MFP. In symbols from 305 up to 307, symbol 1 denotes supporting and 0 denotes not supporting. Moreover, symbol NA denotes that information for the attribute is not stored.

The data shown in FIG. 3 is specifically described by using devices registered in the first row as examples. The data denotes that a device referred to as Mr. COLOR is present in a network address 192.168.16.131, which has a print function, which is a single printer as a configuration, and which supports color print and stable as attributes but which does not support a double-sided print function. Moreover, in this embodiment, it is assumed that the devices from the first to fifth rows shown in FIG. 3 correspond to 101, 102, 104, and 105 in FIG. 1. The information shown in FIG. 3 is an example to the last. It is needless to say that information to be stored in the search server 112 can be additional information including a setting place and the like.

In this case, it is assumed that attributes to be controlled by database 300 for each device include an indispensable attribute that must be registered without fail and an optional attribute that does not need to be always registered.

As for this embodiment, in the database shown in FIG. 3, it is assumed that the object class 303 is an indispensable attribute and the color print 305, double-sided print 306, and staple 307 are optional attributes.

Figure 4:
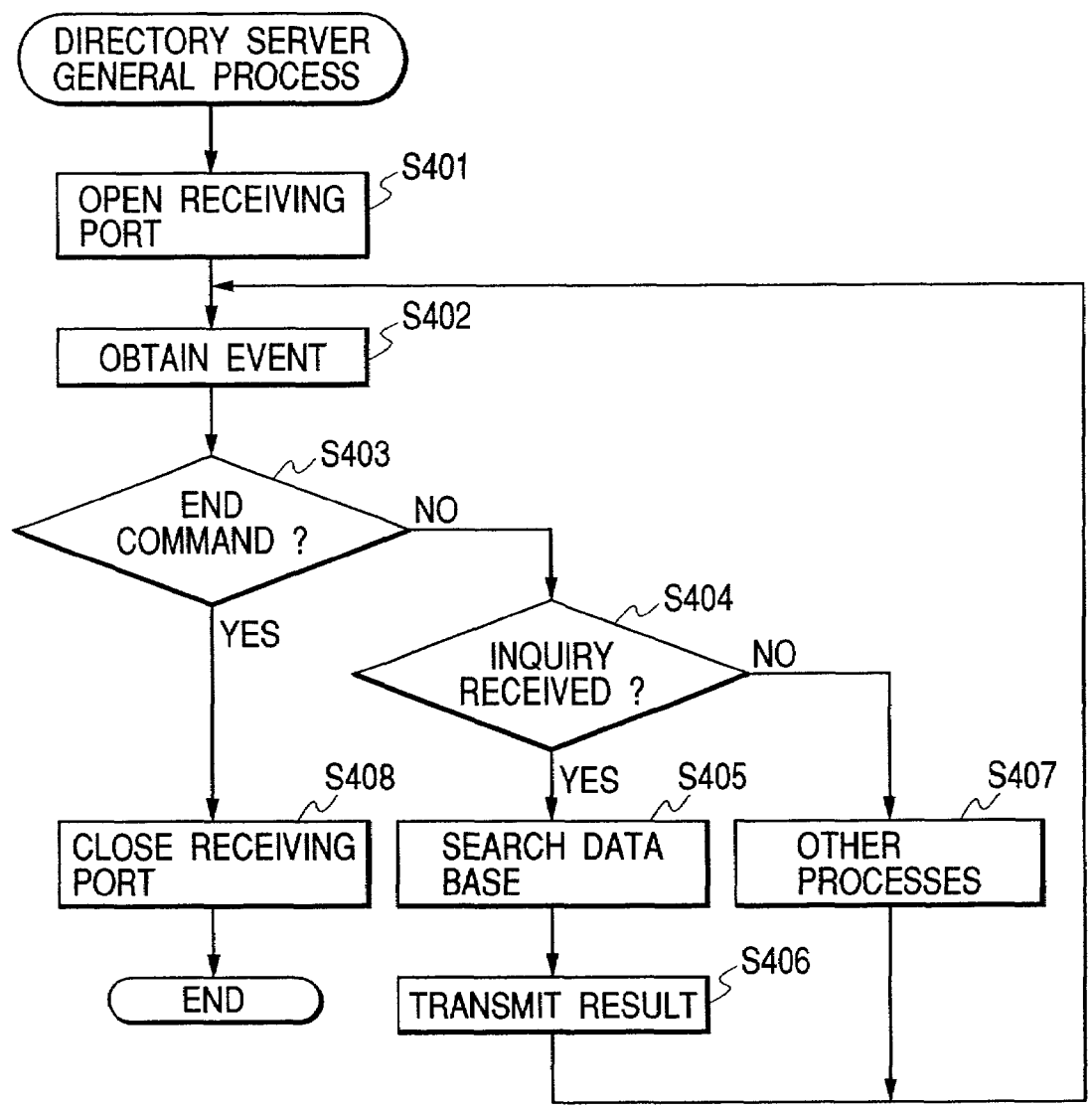
FIG. 4 is a flow chart showing operations of a device search server.

Then, operations of the device search server 112 are described below by referring to flow charts in FIGS. 4 and 5. First, FIG. 4 is a flow chart for explaining operations of the device search server 112. Judgment and execution of a series of the processes are formed by the CPU 201 in the device search server by hardware. When the device search server 112 is started, it first opens a receiving port for receiving a device search request from a device search client in step S401. When receiving the search request from the device search client through the above operation, an operating system issues a reception event and reception of the search request is communicated to a program. Then, the server 112 starts step S402 to wait for any event to be communicated from the operating system. When any event is communicated, the server 112 obtains the event and starts the next step. In the next step S403, the server 112 judges whether the event obtained in step S402 is a system shutdown event by a user. If the event is a shutdown event, the server 112 closes the receiving port in step S408 to end the program. However, when it is judged that the event is not a shutdown event in step S403, the server 112 starts step S404 to judge whether the event is an inquiry event from the device search client. If the event is an inquiry event, the server 112 starts step S405 to select a proper device by collating a search condition obtained through the event with the data base shown in FIG. 3. In the next step S406, the server 112 returns a search result obtained in step S405 to the device search client. However, when it is judged that the event is not an inquired reception event in step S407, a server 112 starts step S407 to perform a process other than the inquired reception event such as update a display screen.

Figure 5:
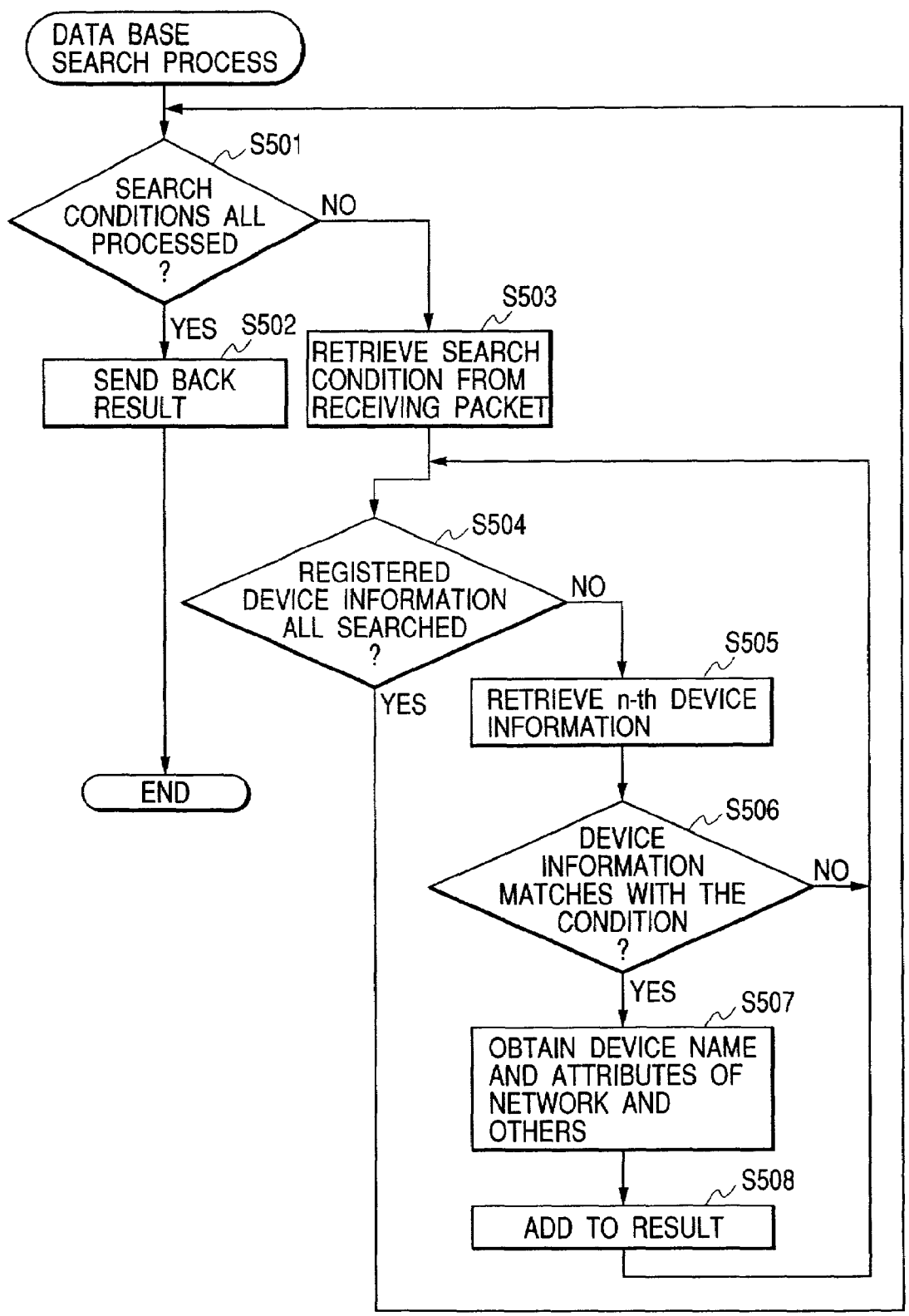
FIG. 5 is a flow chart showing database search operations of a device search server.

FIG. 5 is a flow chart for more minutely explaining the database search operation in step S405 in FIG. 4. The whole is briefly and roughly described below. The database search step of this embodiment uses a system for processing a plurality of search conditions designated by a device search client one by one. This is an outside loop starting with step S501 and returning to step S501 again via the NO judgment. An inside loop starting with step S504, exiting from the NO judgment, and returning to step S504 gain is used to scan all pieces of registered information in the database about one search condition. The loop is described below in detail for each step. In the database search operation, it is judged whether all search conditions are already processed in step S501. When all conditions are already processed, step S502 is started to return a search result to a host program. However, when it is judged in step S501 that not all search conditions are processed, step S503 is started to select one search condition out of the information received from the device search client.

Then, the step S504 is started to judge whether the database 300 for the network device described for FIG. 3 is entirely scanned. When it is judged that scanning ends, step S501 is restarted to process the next search condition. However, when it is judged in step S504 that scanning of the database 300 does not end, step S506 is started. In step S505, data for one device is selected out of the database 300. In the next step S506, it is judged whether the data selected in step S505 matches a search condition. When the data matches the search condition, step S507 is started. However, when it is judged that the data selected in step S505 does not correspond to the search condition, step S504 is restarted to continuously process the next device information registered in the database 300. In step S507, the device name 301, network address 302, device type 304, color 305, double-sided print 306, and staple 307 are selected out of the device information which is judged in step S506 as matched with the search condition to add them to a search result in the next step S508. When step S508 ends, step S504 is restarted to continue scanning of the next data.

Figures 7, 8:
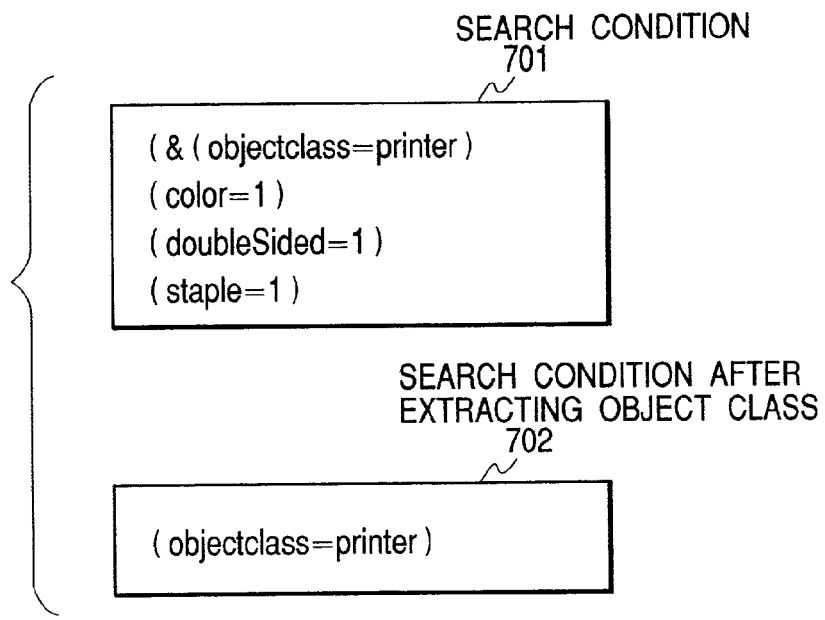
FIG. 7 is an illustration showing a search condition in a device search client.
FIG. 8 is an illustration showing a search result output from a device search server.

Hereafter, for this embodiment, a case is described in which a client requests a device whose object class is a printer as a search condition. FIG. 8 shows a result of searching the database 300 in accordance with the search condition. In FIG. 8, a search result 801 shows that there are four devices matching a condition that an object class is "printer" and pieces of information for device name 801, network address 802, device type 803, presence or absence of color function 804, presence or absence of double-sided print function, and presence or absence of staple function are shown for each device.

Then, operations of a device search client are described below.

Figure 6:
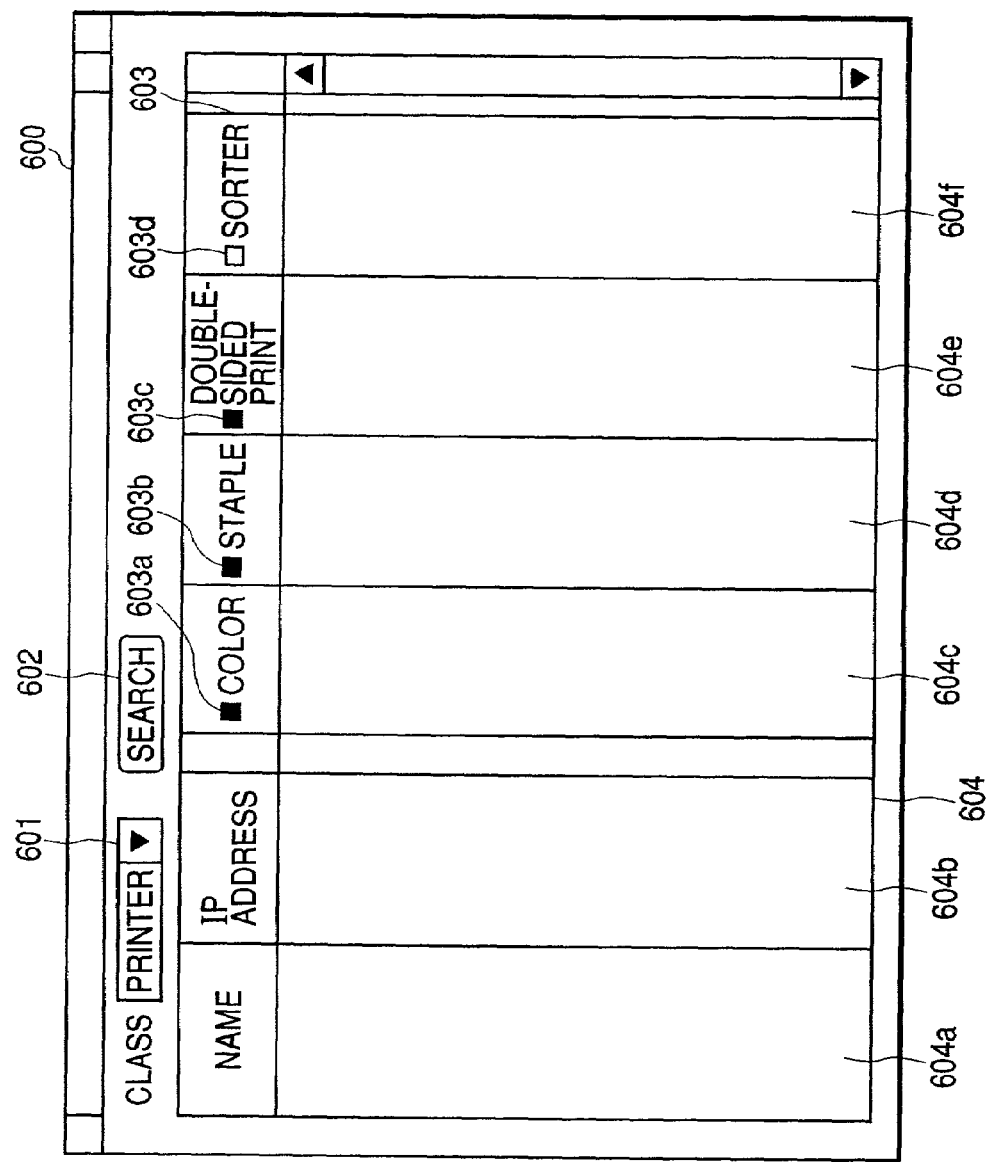
FIG. 6 is an illustration showing indications on a device search screen before device search.

FIG. 6 is an illustration showing indications on a search screen in a search client before search is executed. Various pieces of information are displayed in a window 600. Symbol 601 denotes a COMBO box for designating an object class of a device to be searched. By operating the COMBO box 601, it is possible to set an object class of a device to be searched to "printer" or "scanner". In this case, by changing the setting of the object class, each attribute condition in an area 603 for designating a search attribute is changed to an attribute corresponding to a set object class.

Figure 10:
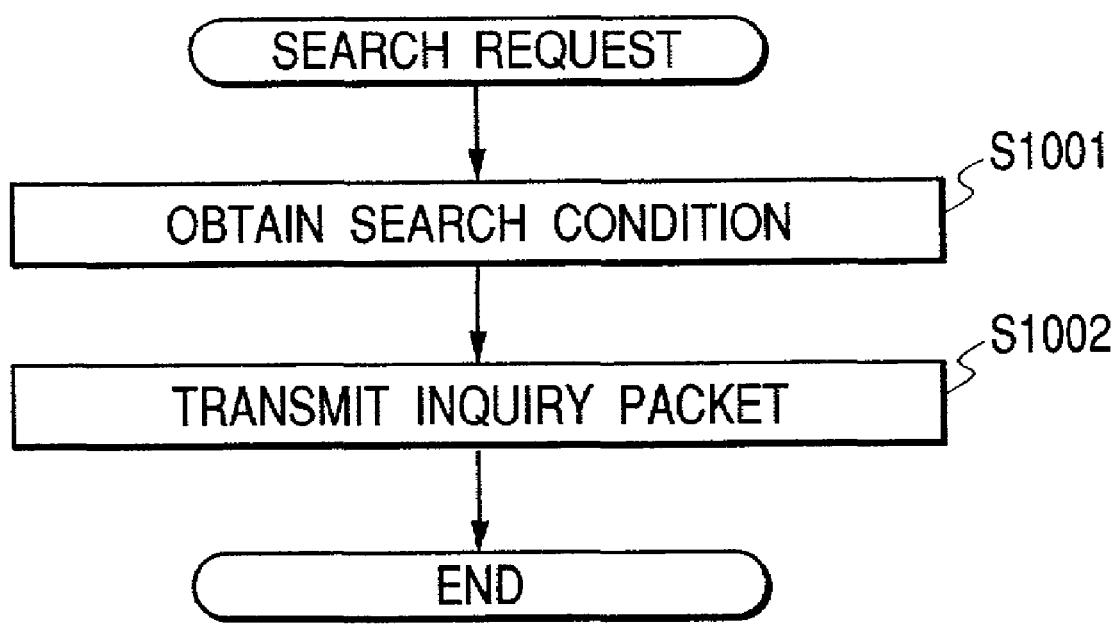
FIG. 10 is a flow chart showing search request operations of a device search client.

Because a printer is selected in the area 603 for designating a search attribute as an object class by the COMBO box 601 in the case of the example in FIG. 10, attributes for a printer are shown by four check boxes. That is, it is possible to designate a search attribute by a check box 603a showing presence or absence of a color print function, a check box 603b showing presence or absence of a staple function, a check box 603c showing presence or absence of a double-sided print function, or a check box 603d showing presence or absence of a sorter function.

In the case of the example shown in FIG. 6, because the check box 603a showing presence or absence of a color print function, check box 603b showing presence or absence of a staple function, and check box 603c showing presence or absence a double-sided function (each box is illustrated by a black square) are respectively checked, search of a device capable of performing color print, double-sided print, and staple processing is requested.

Symbol 602 denotes a search start button. When a user presses the button by using a keyboard 209 in FIG. 3 or a not-illustrated pointing device, whether there is a device matching a search condition designated by the attribute designation area 603 is inquired to the search server PC 112. Moreover, symbol 604 denotes an area for displaying a search result, in which a device-name displaying area 604a, an IP-address displaying area 604b, and areas 604c, 604d, 604e, and 604f for displaying presence or absence of each attribute of a searched device are included.

FIG. 7 is an illustration showing a search condition designated through the search screen in FIG. 6 and search condition data to be inquired of a device search server. Symbol 801 denotes a search condition designated by an operator, which is shown by a logical product of four attributes in the case of this example.

A device having an object-class printer (first line) as a first attribute, a color print function (second line) as a second attribute, a double-sided print function (third line) as a third attribute, and a stable function (fourth line) as a fourth attribute is designated.

Then, a method for extracting a second search condition to be inquired of a search server from a first search condition designated by an operator is described below.

As already described, attributes to be controlled by the database 300 for each device include an indispensable attribute which must be registered without fail and an optional attribute which does not need to be always registered. As for this embodiment, the object class 303 is an indispensable attribute and the color print 305, double-sided print 306, and staple 307 are optional attributes.

Therefore, only an indispensable attribute is extracted from the first search condition designated by an operator to generate a second search condition to be inquired of a search server.

In the example in FIG. 7, an indispensable attribute is only the object class among search conditions 701 designated by an operator. Therefore, a search condition 702 to be inquired of a device search server is generated.

Figure 9:
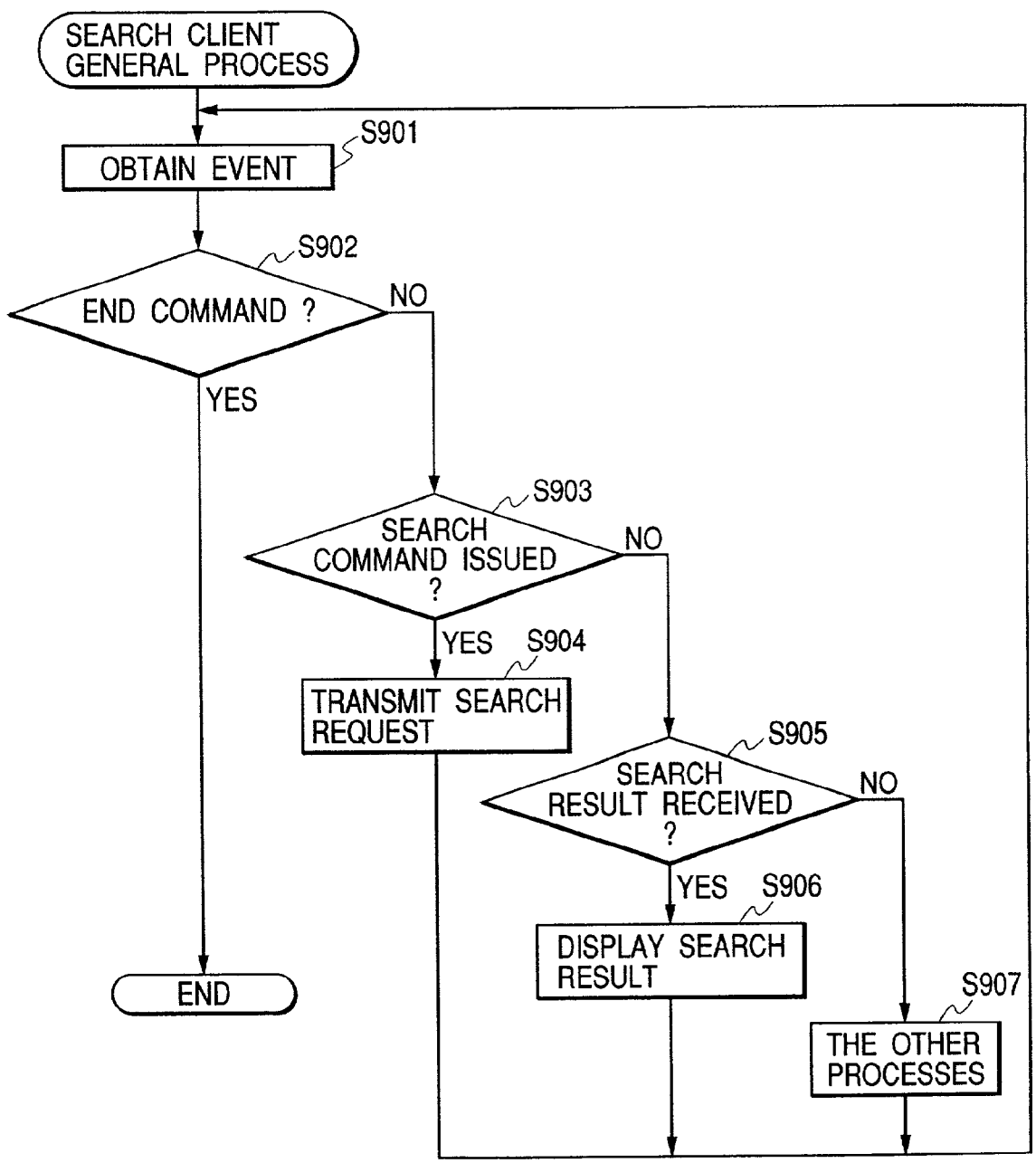
FIG. 9 is a flow chart showing operations of a device search client.

FIG. 9 is a flow chart showing operations of the device search clients 111 and 113. It is also possible to execute a program of a device search client on the device search server 112. First, rough operations of the program of the device search client are described below. The program waits for an event until a system ends and when an event occurs, operates as an event-driving-type program for processing the event. Main events include a system ending event, a device search requesting event, and a device search result event receiving event. Hereafter, each step is described in detail.

When a search client is started, the client first waits in step S901 until an event occurs. When an event occurs, the client obtains the event and starts step S902. In step S902, it is judged whether the event obtained in step S901 is an event generated because a user issues a system-ending command by using the keyboard 209 or a not-illustrated pointing device. If it is judged that the user issues the ending command, the program ends. However, when it is judged in step S902 that the event is not an ending-command issuing event, step S903 is started. In step S903, it is judged whether the event obtained in step S901 is generated because the user issues a device searching command by selecting a search menu 701. When the event is an event generated because a device search command is issued, step S904 is started to transmit a device search request to the device search server 112. However, when it is judged in step S903 that the event is not an event generated because the device search command is issued, step S905 is started. In step S905, it is judged whether the event obtained in step S901 is an event due to reception of an answer of a search result from the device search server 112 to the device search request transmitted in step S904. When it is judged that the event is an event due to reception of the answer, step S906 is started to display the received search result on a window 700. When the process in step S906 ends, step S901 is restarted to wait for the next event.

However, when it is judged in step S905 that the event is not an event due to reception of the answer, step S907 is started to perform other process. The other process includes, for example, re-drawing a screen when a program is started or a user moves a window on a screen. When step S907 ends, step S901 is restarted to wait for the next event.

FIG. 10 is a flow chart explaining the search request operation S904 in detail in the flow chart in FIG. 9. First, in step S1001, the RAM 203 is accessed to obtain previously-stored search conditions as shown in FIG. 8. IN the next step S1002, only a condition about an object class is extracted from the search conditions and transmitted to the search server 112 to request search of a network device.

It is assumed that an address of a device search server is previously known by writing a value input by a user through the keyboard 209 in the hard disk 211 and reading the value. However, the address is not restricted to the above case. As other method, it is also permitted to obtain the address from a network by using a technique such as a double space in a programming language Linda.

Figure 11:
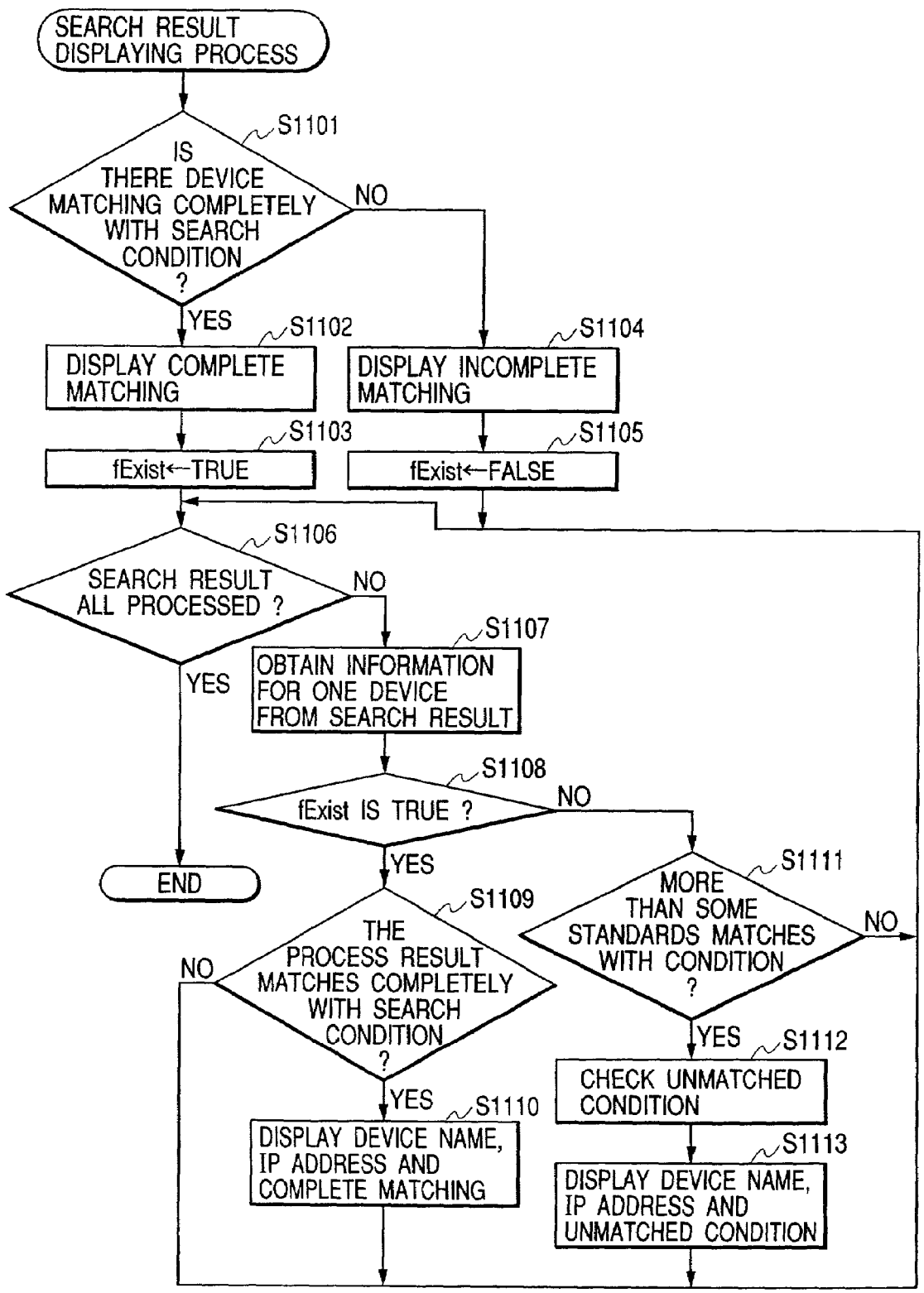
FIG. 11 is a flow chart showing search-result display operations of a device search client.

FIG. 11 is a flow chart explaining the search result displaying operation S906 in the flow chart in FIG. 9 in detail. In the search result displaying operation, a received search result is checked in step S1101 to judge whether there is a device completely corresponding to a search condition temporarily stored in the RAM 203. When there is only one device completely matching the search condition, step S110 is started. In step S1102, a screen is rewritten by operating the CRTC 206 to display that the device completely matching the search result displaying area 705. In the next step S1103, TRUE is substituted for a temporary variable fExist showing whether the device completely matching the area 705 in order to store that the device completely matching the area 705. When the process in step S1103 ends, step S1106 is started. In step S1101, when there is not any device completely matching the condition, step S1104 is started. In step 1104, the screen is written by operating the CRTC 206 to display that the device incompletely matches the search result displaying area 705. In the next step S1105, FALSE is substituted for the temporary variable fExist in order to store that the device incompletely matches the area 705. When the process in step S1105 ends, the flow joins step S1106.

A loop returning to step S116 from step S1106 through the NO judgment is a loop for processing all pieces of device information included in a received search result (search result 801 shown in FIG. 8 (that is, a loop for judging whether the pieces of device information and displaying them one by one in order). In step S1106, it is judged whether all pieces of device information included in a received search result are already processed. When it is judged that all pieces of device information are already processed, the whole process is completed. In step S1106, however, if it is judged that not all received pieces of information are processed, step S1107 is started to select one piece of information out of one received piece of information or more. In the next step S1108, process is divided depending on whether the value of fExist substituted in the previous step S1103 or S1105 is TRUE or FALSE. When fExist is TRUE, that is, there is a device completely matching the condition, step S1109 is started. However, because there are some devices not completely matching the search condition in received device information, only device information completely matching the condition is sorted from the device information. The sorting is performed in step S1109. In step S1109, it is judged whether the device information obtained in step S1107 completely meets the search condition 801 temporarily stored in the RAM 203. When the information completely meets the condition 801, step S1110 is started. In step S1110, the CRTC 206 is controlled to rewrite the screen and display a device name, a network address, and the fact that the device information completely matches the condition 801 in the device information displaying area 704. When the process in step S1110 is completed, step S1106 is restarted to process the next device information. However, when it is judged in step S1109 that the device information does not completely match the condition 801, step S1106 is quickly restarted without performing the display process in step S1110.

Then, the process when fExit is FALSE In step S1108 is described below. When fExit is FALSE in S1108, step S1111 is started. In this case, various pieces of information from information not completely matching the search condition 801 except that an object class matches the condition 801 up to information one step before complete matching are included in a received search result. It is preferable to select only information as important as possible out of these pieces of information and display the information for a user. The judgment for that is performed in step S1111. In this case, "matching in a certain criterion or more" is judged when information matches two conditions or more among three designate conditions (presence of color, presence of both sides, and presence of staple), that is N-1 conditions among N conditions. Moreover, it is needless to say that it is permitted to properly set a matching-condition criterion such as N-2 or N-3 conditions.

In step S1111, it is judged whether the device information obtained in step S1107 meets two attributes or more out of three attributes (presence of color, presence of both sides, and presence of staple) of the search condition 801. If it is judged that the information meets two attributes or more, step S1112 is started. In step S1112, attributes not met by the information are checked. In the next step S1113, the CRTC 206 is controlled to update the screen and display a printer name and a network address out of the information obtained in step S1107 and conditions (attributes) unmatched in step S1112. When the process in step S1113 is completed, step S1106 is restarted to continue the next information process. However, when it is judged in step S1111 that the information does not meet two attributes or more, step S1106 is restarted.

FIG. 12 is an illustration specifically showing screen indications of search results displayed on the search client PCs 111 and 113 after the device search process is ended by the search server PC 112. As described above, this embodiment shows a result of using a printer as an object class and searching a device having a color print function, a double-sided print function, and a staple function.

Therefore, in this case, it is displayed in the device-name displaying area 604a that there are four devices each of whose object classes is a printer and their names are "Mr. Color", "Second-floor high-speed machine", "Development room printer", and "First-floor printer".

Moreover, presence or absence of attributes designated as search conditions for each device displayed as a search result are displayed in attribute presence/absence displaying areas 604c, 604d, and 604e. In the attribute presence/absence displaying areas 604c to 604e, symbol "○" denotes supporting the function and symbol "—" denotes not supporting the function.

In this case, the example in FIG. 12 shows a case in which there is not any device completely matching a search condition. However, when there is a device completely matching a search condition, it is displayed on the search screen 600 that a device completely matching a search condition is found.

Thus, according to the first embodiment, it is possible to make a user easily understand that a searched device meets which attribute or does not meet any attribute even if the device does not completely match a search condition and save the time for the user to search a desired device again by moderating a search condition.

<Second Embodiment>

In the case of the above first embodiment, the second search condition to be inquired of a search server is extracted from the first search condition designated by an operator at the search client side.

In the case of the second embodiment, a second search condition to be inquired of a search server is extracted from a first search condition designated by an operator at the search server side.

That is, when a device matching the first search condition is not present as a result of executing search in accordance with the first search condition, the search server extracts the second search condition, executes re-search, and return the result to a search client.

Figure 13:
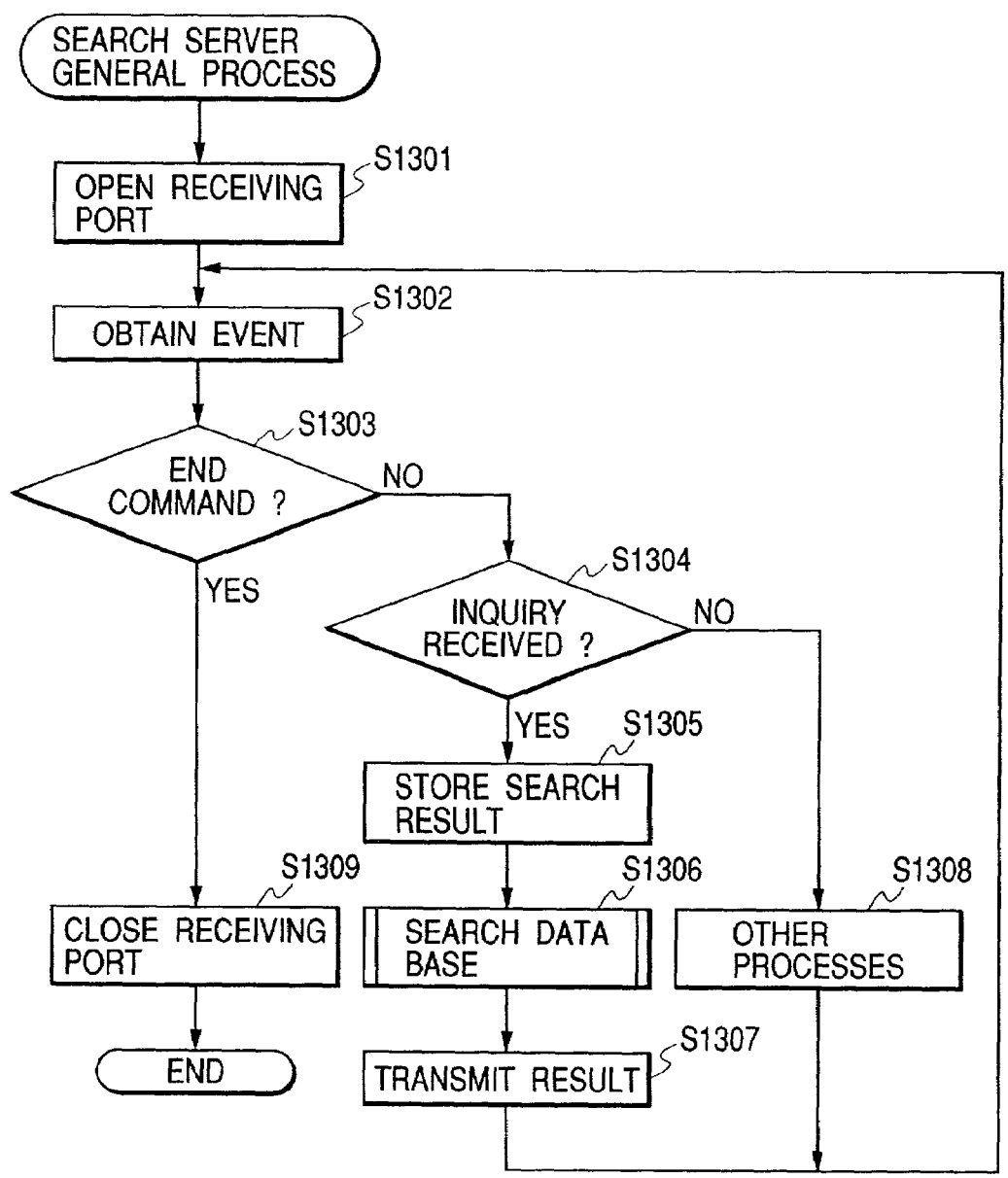
FIGS. 13, 14, 15 are flow charts showing operations of a device search server of a second embodiment.

FIG. 13 is a flow chart showing the general process for device search performed by a search server PC 112. Judgment and execution of a series of the processes are performed by a CPU 201 in the search server PC 112 through hardware. The search server PC 112 operates in accordance with an event-driving-type program. That is, when any event occurs, the server PC 112 analyzes the event and executes a corresponding process. As for the following example, a case is described in which an operation is performed in accordance with a device search request sent from a search client PC 111.

When the search server PC 112 is started, it first opens a receiving port in order to receive a device search request from a search client PC 111 or 113 in step S1301. According to the above operation, when receiving a device search request from, for example, the search client PC 111, the operating system of the search server PC 112 issues a reception event and it is communicated to a device search program that the device search request is received.

Then, step S1302 is started to wait for any event to be communicated from the operating system. When any even is communicated, the server PC 112 obtains the event and starts the next step S1303. In step S1303, the server PC 112 judges whether the obtained event is an end command, that is, a system shutdown event by a user. When the obtained event is a shutdown event as a result of the above judgment, the server PC 112 closes the receiving port in step S1309 and thereafter, ends the process of the device search program.

When the server PC 112 judges in step S1303 that the obtained event is not a shutdown event, it starts step S1304 to judge whether the obtained event is an inquiry reception event sent from a search client PC. In this case, when the obtained event is an inquiry reception event, the server PC 112 starts step S1305, retrieves a search condition from a receiving packet, and stores the packet in a memory such as the RAM 203 shown in FIG. 3.

Moreover, the server PC 112 stars step S1306, collates the database 300 in FIG. 3 with a search condition inquired from the search client PC 111, and selects a proper device. Details of a device search process using the database 300 is described later by referring to FIG. 14. In the next step S1307, the server PC 112 returns a search result obtained through the database search process in step S1306 to the search client PC 111.

Moreover, in step S1304, the server PC 112 judges that the obtained event is not an inquiry reception event, it starts step S1308 to perform processes other than processes of a shutdown event and inquiry reception event such as a process for updating a screen and a process for registering network address information and attribute information received from network devices 101 to 105 in the database 300 shown in FIG. 3.

Then, the device search process performed by the search server PC 112 in step S1306 in FIG. 13 is more minutely described below by referring to the flow chart in FIG. 14. First, the outline of the general process is described below. In the case of the device search process of this embodiment, when the search client PCs 111 and 113 designate a plurality of search conditions, these search conditions are processed one by one. This is an outside loop judged in step S1401. Moreover, an inside loop judged in step S1404 is used to scan all pieces of registered device information in the database 300 about a certain search condition.

In the case of the device search process of this embodiment, it is first judged in step S1401 whether all search conditions stored in a memory such as the RAM 203 are already processed in step S1401. As a result, when it is judged that all search conditions in the memory are already processed, step S1402 is started to execute a re-search process. The re-search process is described later.

However, it is judged in step S1401 that not all search conditions in the memory are processed yet, step S1403 is started to retrieve one unprocessed search condition from all search conditions stored in the memory. Then, step S1404 is started to judge whether all pieces of registered device information in the data base 300 are already searched. When all pieces of registered device information are already searched as a result of the above judgment, step S1401 is restarted to process the next search condition.

Moreover, in step S1304, when it is judged that not all pieces of registered device information in the database 300 in FIG. 3 are searched, step S1405 is started. In step S1305, registered device information for the n-th device is retrieved from the database 300. Then, in the next step S1406, it is judged whether the retrieved registered device information matches a currently-purposed search condition.

When the retrieved registered device information does not match the search condition as a result of the above judgment, step S1404 is restarted (in this case, the value of n is incremented), the next device information registered in the database 300 is continuously searched. However, when the retrieved registered device information matches the search condition as a result of the judgment in step S1406, step S1407 is started.

In step S1407, pieces of information for the device name 301, network address 302, device type 304 and moreover, color print function attribute 305, double-sided print function attribute 306, and staple function attribute 307 are obtained out of the registered device information which is judged as matching the search condition in step S1406. Then, in the next step S1408, the obtained pieces of information are added to search result information. When the process in step S1408 is done, step S1404 is restarted to continuously search the next device information registered in the database 300.

Thus, when searching all pieces of device information registered in the database 300 shown in FIG. 3, every piece of device information completely matching each search condition is detected every search condition. Then, after every piece of device information is re-searched in step S1402, it is returned to a host program in step S1409 and returned to the search client PC 111 hitherto outputting a device search request in step S1307 n FIG. 13.

Then, operations when the search server PC 112 performs re-search are described below by referring to the flow chart in FIG. 15.

Figure 14:
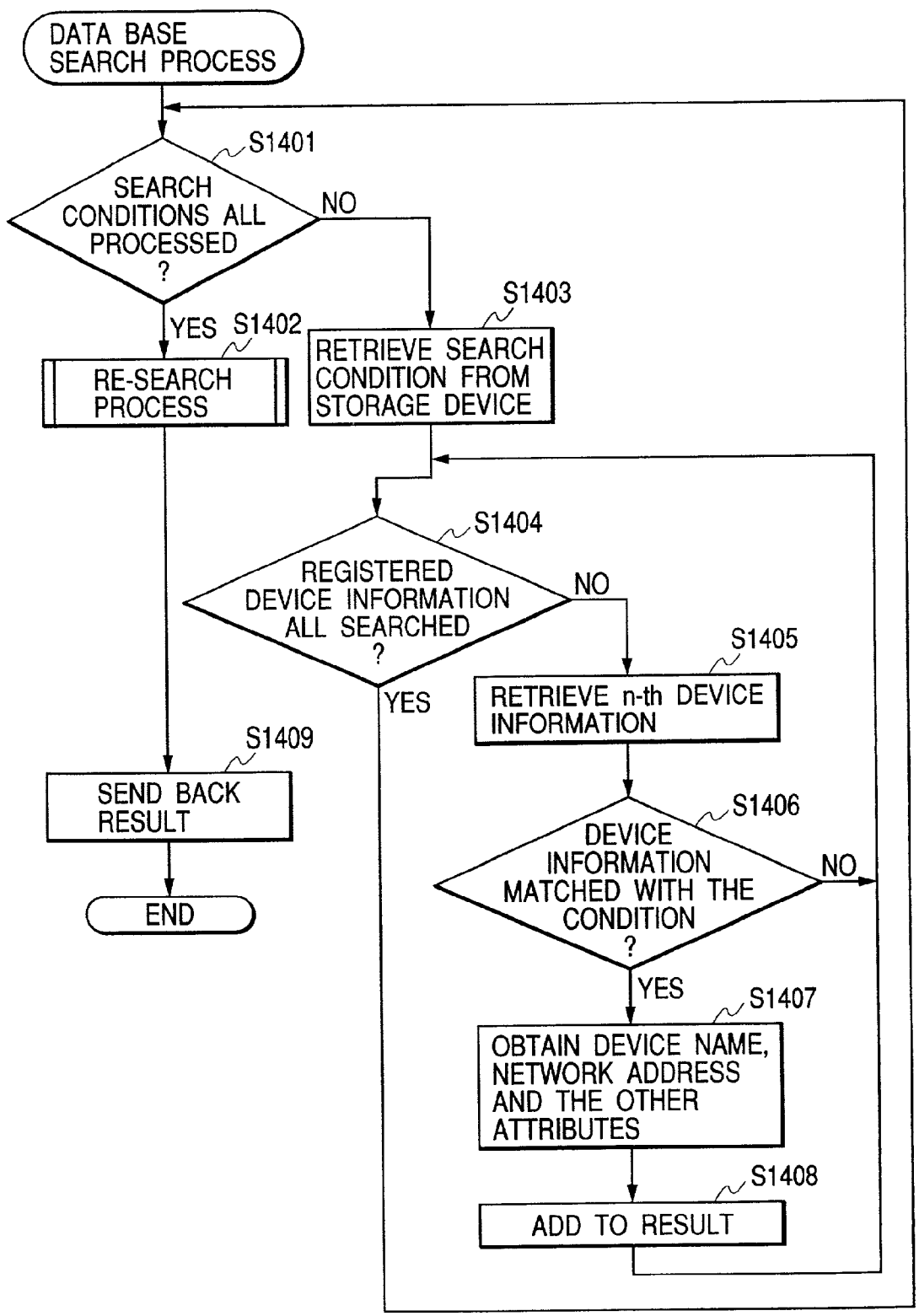
Figure 15:
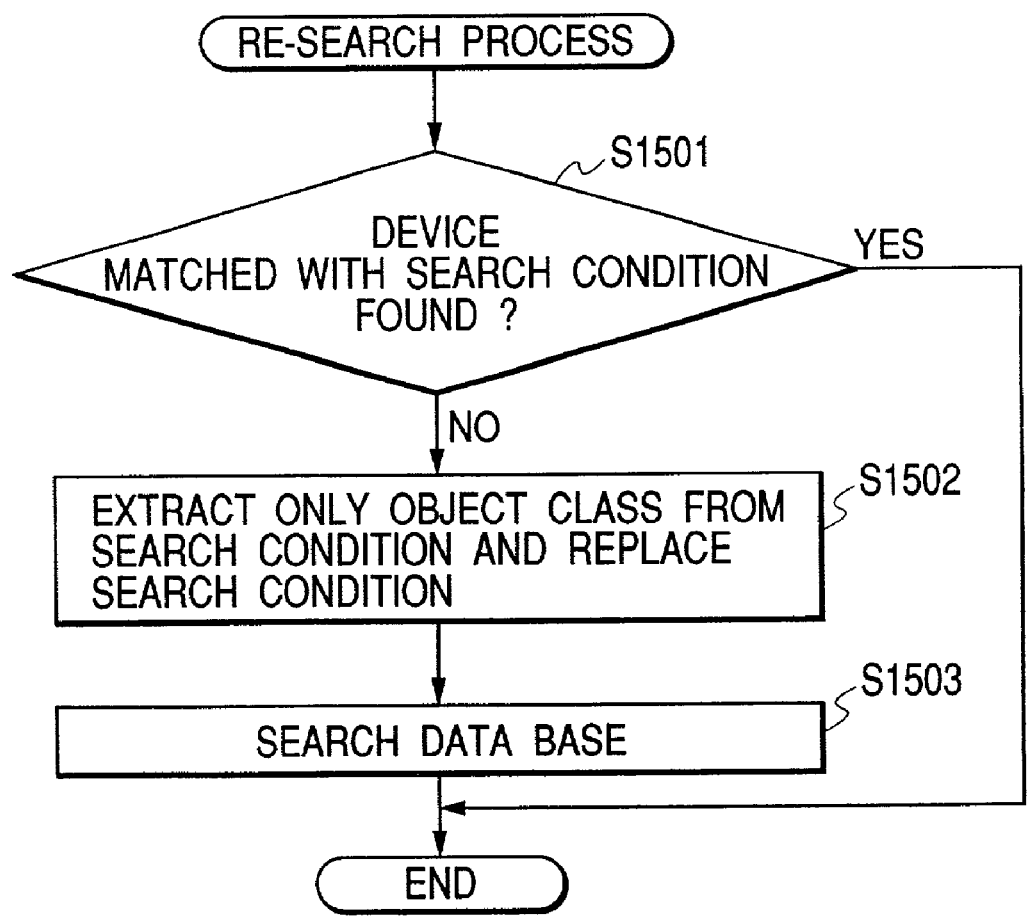

In FIG. 15, first in step S1601, it is judged whether a device completely matching a search condition sent from the search client PC 111 stored in the memory in step S1305 (device meeting all search attributes) is found when executing the database search process shown in FIG. 14 in accordance with the search condition.

In this case, when it is judged that the device completely matching the search condition received from the search client PC 111 is found, the process ends without doing anything because the device matching the search condition is already communicated to the search client PC 111 in step S1307 in FIG. 13. However, when a device matching the search condition received from the search client PC 111 is not found, step S1502 is started to extract only the information for an object class out of a search condition stored in a memory such as the RAM 203 and replace the search condition with the object class.

Then, step S1503 is started to execute the database search process shown in FIG. 15 again in accordance with the database 300 shown in FIG. 15 and end the process.

Thus, according to the second embodiment, it is possible to make a user easily understand that a searched device meets which attribute or does not meet any attribute even if the device does not completely match a search condition and a user can save the time for performing re-search by moderating a search condition in order to search a desired device.

Moreover, because re-search is executed by extracting a second search condition from a first search condition designated by an operator at the search-server side, it is possible to univocally control the extraction process at the server side.

<Third Embodiment>

For the first embodiment, a case is described in which search results are displayed in the form of a list. A case of understandably displaying search results with icons is described as the third embodiment.

Figure 17:
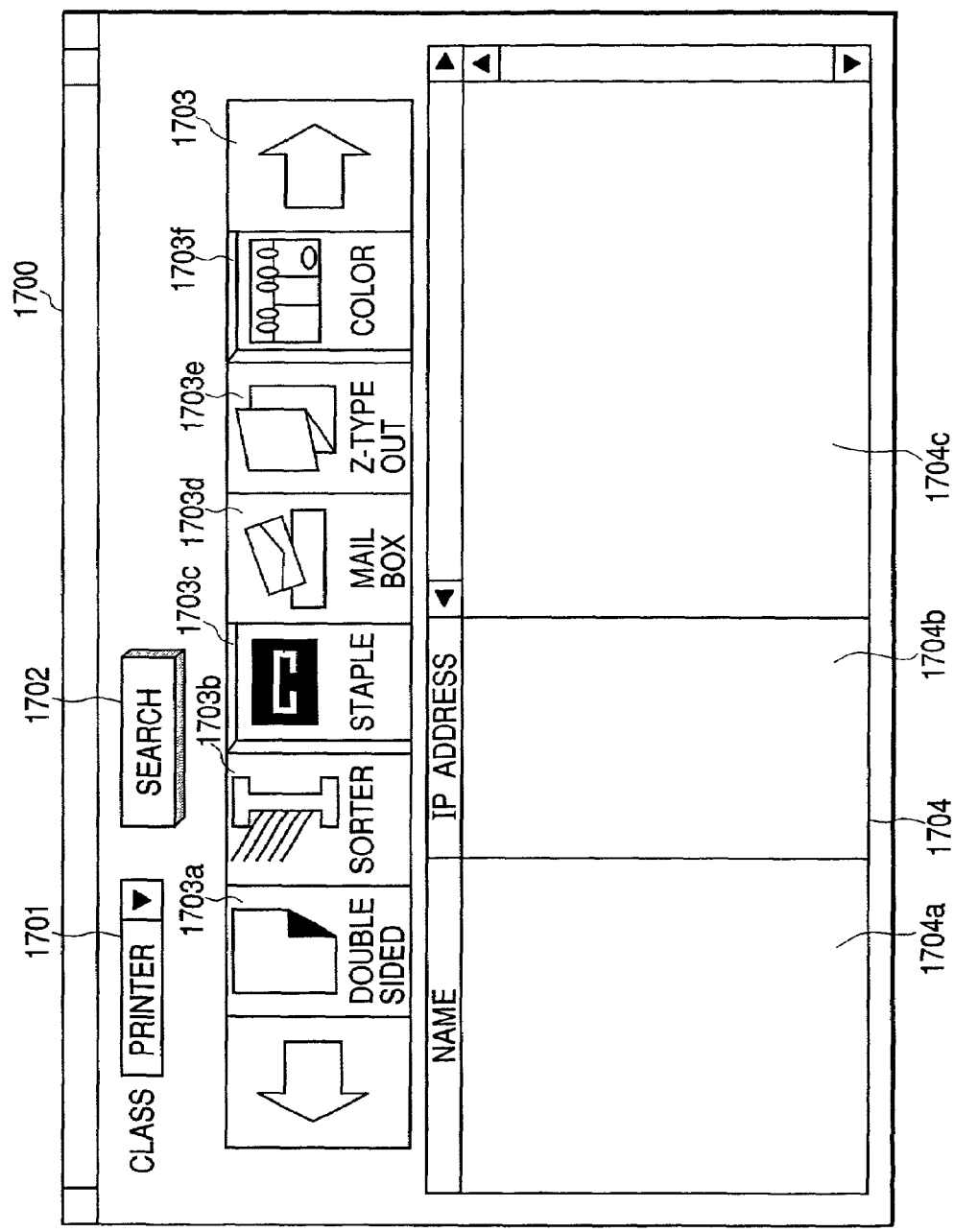
FIG. 17 is an illustration showing indications on a device search screen before device search in a third embodiment.

FIG. 17 shows an example of screen display of device search clients 111 and 113 before searching a device. In FIG. 17, various pieces of information are displayed in a window 1700 in which symbol 1701 denotes a COMBO box for designating an object class of a device to be searched. By operating the COMBO box through a keyboard 209 or a not-illustrated pointing device, it is possible to set an object class of a device to be searched to "printer" or "scanner". Symbol 1702 denotes a search start button. When a user presses the button through the keyboard 209 or not-illustrated pointing device, whether a matched device is present is inquired to a device search server 112. Symbol 1703 denotes an area for designating a search attribute (hereafter referred to as attribute area 1703). Because an object class is set to a printer by the COMBO box 1701, an attribute for the printer is displayed in the attribute area 1703 as an icon. In this case, when a scanner is set by the COMBO box 1701, an attribute for the scanner is displayed in the attribute area 1703 as an icon. The following attributes are displayed as icons in the attribute area 1703 of this example so that a user can designate them: whether double-sided print can be made (1703a), whether a sorter function is present (1703b), whether a staple can be used (1703c), whether a mail box function is present (1703d), Z-type-out can be output, and color print can be made (1703f). The example in FIG. 17 shows a state in which attributes of the staple 1703c and color 1703f are selected and shows that each attribute is selected by displaying the attribute as an indication having a cubic sense as if a button is pressed. Symbol 1704 denotes an area for displaying search results, in which a device name 1704a, an IP address 1704b, and details 1704c other search results are displayed.

Figure 19:
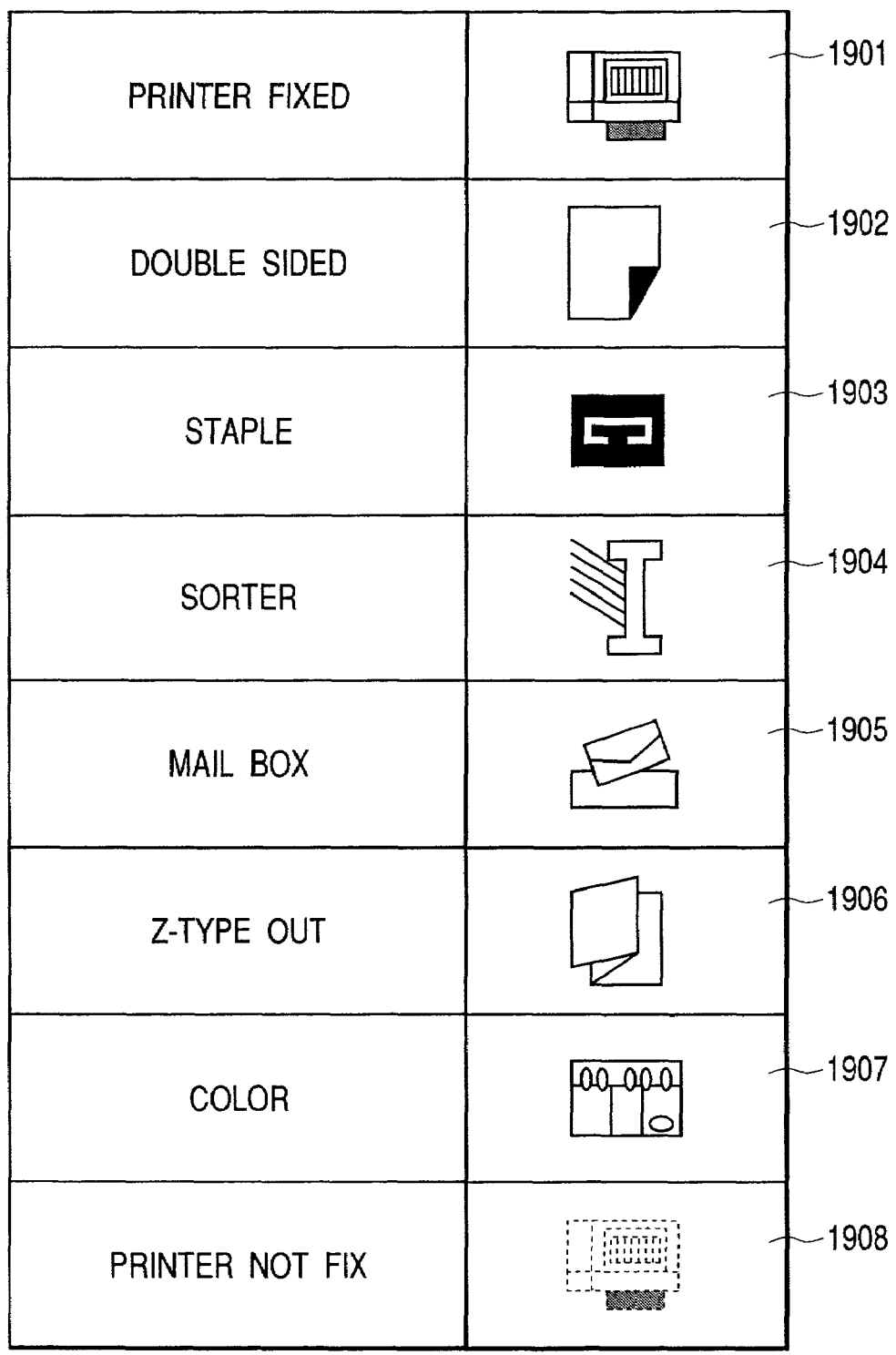
FIG. 19 is an illustration showing a corresponding map between device search attributes and device icons.

FIG. 19 is an illustration showing a corresponding map between search results and icons. Symbol 1901 denotes an icon showing that a printer whose attribute is completely matched is found, 1908 denotes an icon showing a printer whose attribute is locally matched, which is displayed in the area 1704a together with a device name. In this case, an icon 1901 and an icon 1908 have the same printer shape and the color and density of the icon 1908 are made thinner than those of the icon 1901 so that a user can more easily understand them. Symbols 1902 to 1907 are icons showing matched attributes showing double-sided print, stable, sorter, mail box, Z-type out, and color print in order which are displayed in the area of search-result details 1704c. Moreover, the icons 1902 to 1907 use the same attribute ions shown in the attribute area 1703 in FIG. 17 so that a user can intuitively understand a search result.

Figure 16:
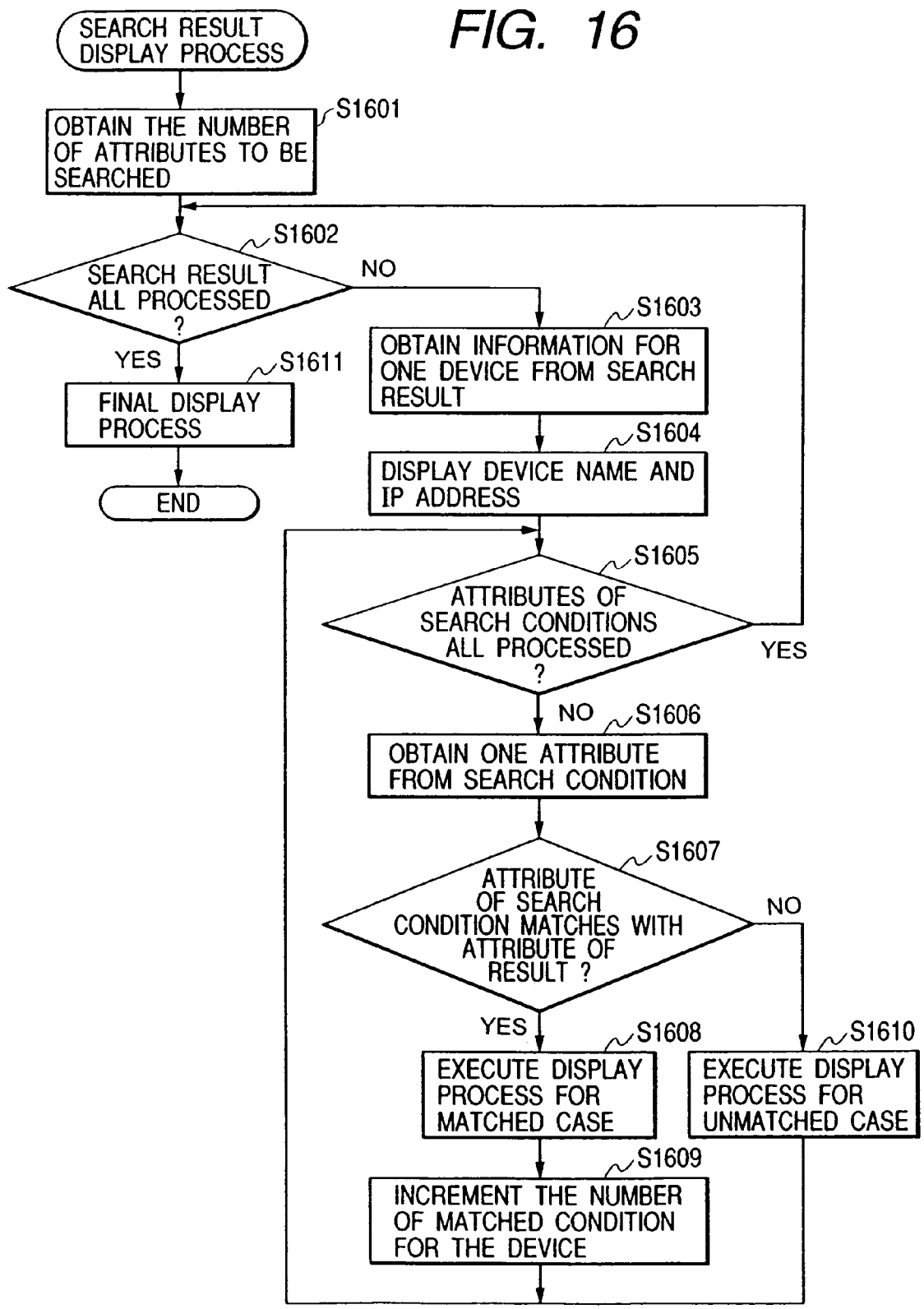
FIG. 16 is a flow chart showing operations of a device search client of the second embodiment.

FIG. 16 is a flow chart for explaining search-result displaying operations of a search client.

First, in step S1601, the number of attributes to be searched is obtained from a search condition temporarily stored in the RAM 203.

An example of this embodiment uses three attributes to be search (color function, staple function, and double-sided function).

In step S1602, it is judged whether all search results are processed. When all search results are processed, step S1611 is started. In step S1611, the final display process is performed so as to be understandable for a user. For example, the final process is a process for reconfiguring indications on the display screen 1704 so that devices are arranged starting with a device having the most matched attributes.

When an unprocessed search result is present in step S1602, step S1603 is started to obtain the information for one device from a search result. In step S1604, the device name 704a and IP address 704b are displayed in accordance with the information. In step S1605, it is judged whether all attributes of a search condition stored in the RAM 203 are already processed. When all attributes are already processed, step S1602 is restarted to process the next device information. An attribute is obtained from the search condition in step S1606 and it is judged in step S1607 whether the attribute matches an attribute of a device obtained from a search result. When the former matches the latter, an attribute icon corresponding to the matched attribute is displayed in the area 1704c of a device currently processed as the display process when matched in step S1608.

In step S1609, a counter for counting the number of matched attributes set to the RAM 203 for each device is incremented. The counter is used to display devices so that the devices are arranged starting with a device having the most matched attributes in the final display process in step S1611. When the attributes are not matched each other in step S1607, attribute icons corresponding to the attributes are not displayed. According to the above operations, it is possible to display which attribute matches an attribute of a search condition and which attribute does not match it as a list and make a user easily understand a search result.

Figure 18:
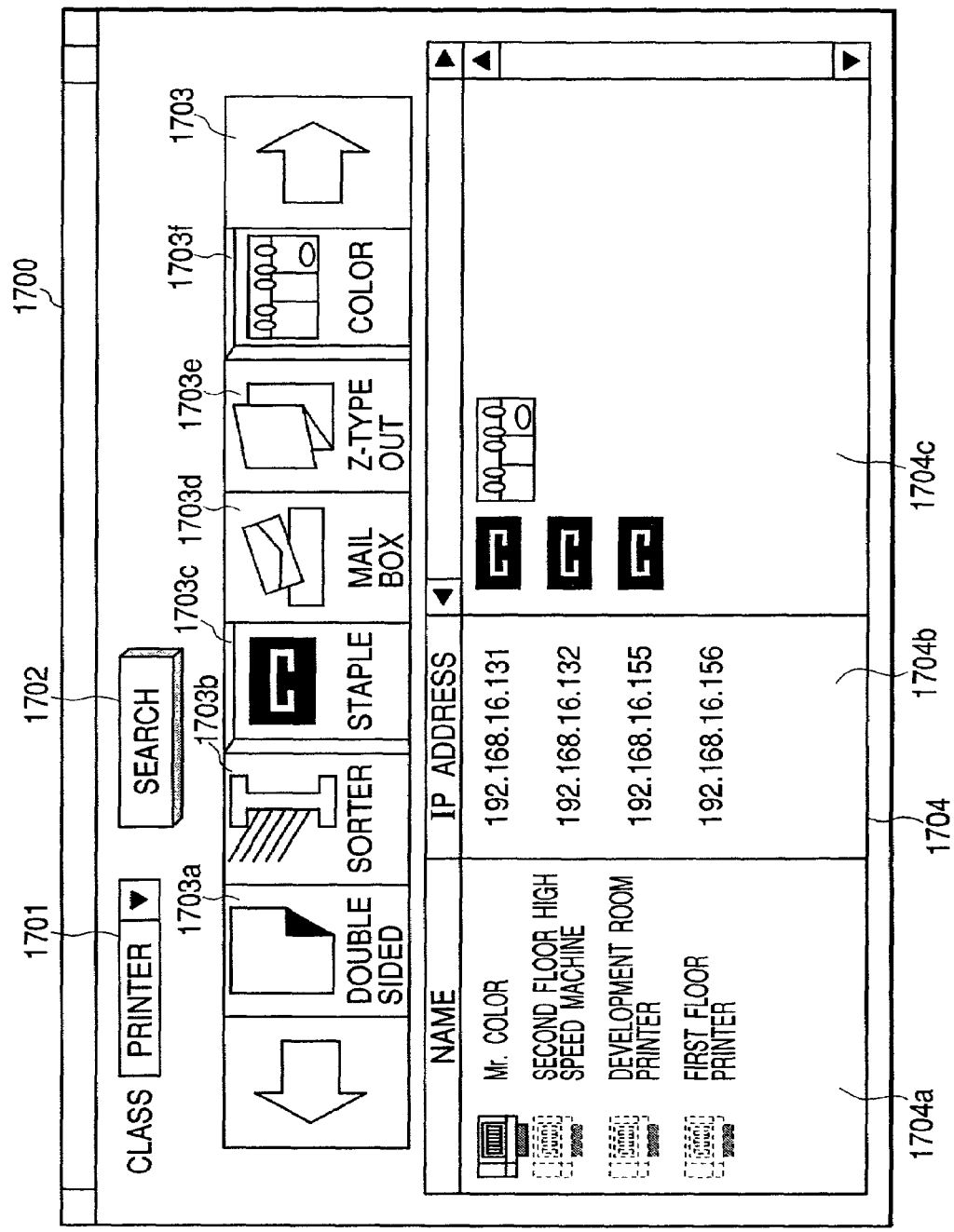
FIG. 18 is an illustration showing indications on the device search screen after device search in the third embodiment.

FIG. 18 shows results thus processed. According to FIG. 18, it is shown that four devices are found. In the case of a device "Mr. Color", a staple icon 1903 showing presence of a staple function and a color icon 1907 showing presence of a color function are displayed in the area 1704c. From this, it is found that the device has both the staple function and color print function.

Moreover, because the two attributes are the whole of the search condition, the icon 1901 showing that the attributes are completely matched each other is displayed in the area 1704*a*. In the case of "second-floor high-speed machine" and "development room printer", only the staple icon 1903 is displayed in the area 1704*c*. Moreover, the machine and the printer are not provided with the color print function of the search condition. Therefore, the icon showing that attributes are locally matched is displayed in the area 1704*a*. The device "first-floor printer" is a search condition because no icon is displayed in the area 1704*c*. Because neither color print function nor staple function are provided and only a condition that an object class is a printer is matched, the icon 1908 showing that attributes are locally matched is displayed in the area 1704*a*.

Thus, according to the third embodiment, because a result for each attribute data of a search condition designated by a user is displayed in the form of an icon, an operator can intuitively understand matched attribute data and unmatched attribute data.

It is also permitted that a network device control program of the present invention is executed by the PC 200 in accordance with an externally installed program. Moreover, the present invention an be applied to a case in which the program is supplied to the PC 200 by loading an information group including a program on the PC 200 from an external storage medium by a storage medium such as a CR-ROM, flash memory, or floppy disk or through a network for electronic mail or personal-computer communication.

Figure 20:
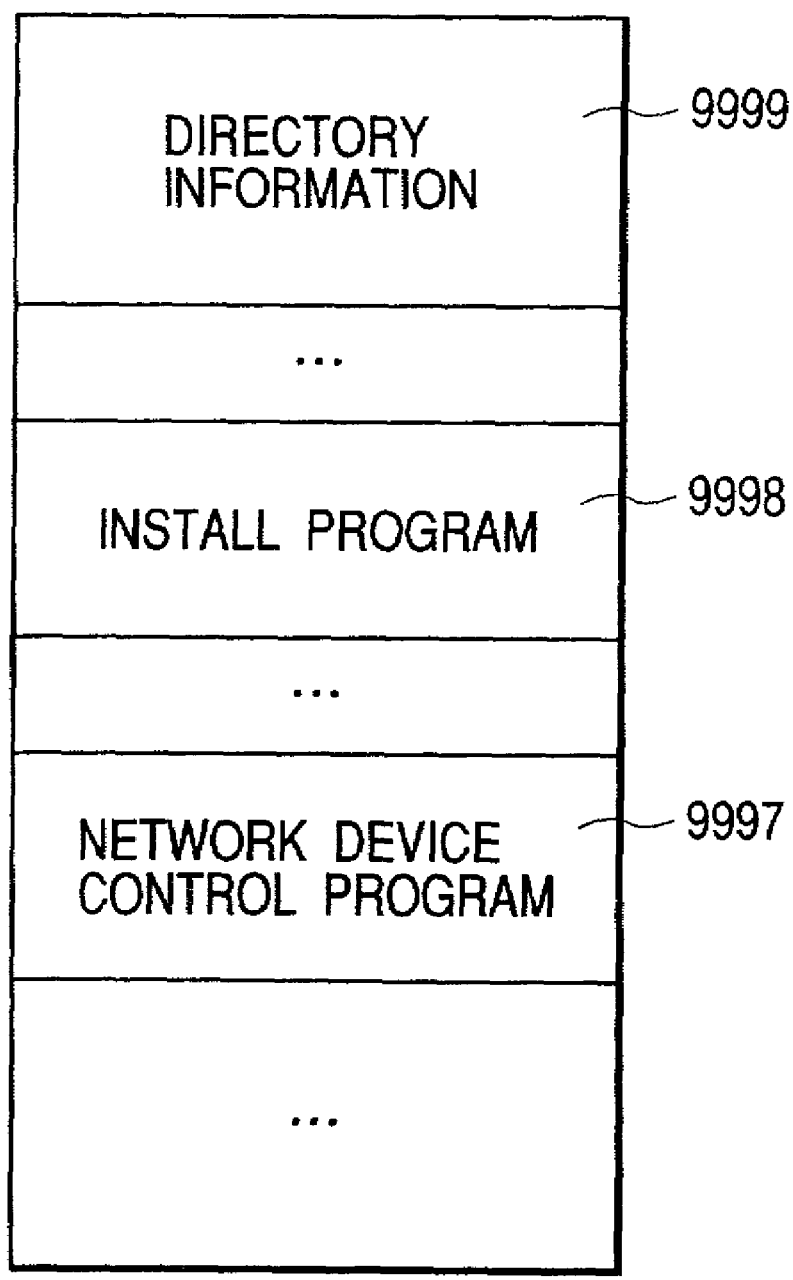
FIG. 20 is an illustration showing a memory map in a storage medium of device search software of the third embodiment.

FIG. 20 is a memory map of a storage medium storing a program of the present invention, in which it is assumed to use a CD-ROM as the storage medium. Symbol 9999 denotes an area storing directory information, which shows positions of an area 9998 storing subsequent install programs and an area 9997 storing a network device control program. The area 9998 is an area storing install programs. The area 9997 is an area storing a network device control program. When a network control program of the present invention is installed in the PC 200, an install program stored n the area 9998 storing an install program is loaded in a system and executed by the CPU 201. Then, the install program executed by the CPU 201 reads a network device control program from the area 9997 storing the network device control program and stores the program in the hard disk 211.

It is permitted to apply the present invention to a system comprising a plurality of units (such as host computer, interface unit, and reader), an integrated apparatus, or an apparatus comprising one unit.

Moreover, it is needless to say that an object of the present invention can be achieved when a storage medium storing a program code of the software for realizing functions of the above embodiments is supplied to a system or apparatus and the computer (or CPU or MPU) of the system or apparatus reads the program code from the storage medium.

In this case, the program code read out of the storage medium realizes a new function of the present invention and the storage medium storing the program code constitutes the present invention. A storage medium for supplying a program code can use any one of a floppy disk, hard disk, optical disk, photomagnetic disk, CD-ROM, CD-R, magnetic tape, nonvolatile memory card, and ROM.

Moreover, by executing a program code read by a computer, functions of the above embodiments can be realized and moreover, realized when an OS working on the computer performs a part or the whole of an actual process in accordance with the program code.

Furthermore, functions of the above embodiments can be realized when a program code read out of a storage medium is written in a memory provided for a function extending board inserted into a computer or a function extending unit connected to the computer and then, a CPU provided for the function extending board or function extending unit performs a part or the whole of an actual process.

Furthermore, it is needless to say that the present invention can be applied to a case of allotting a program from a storage medium storing a program code of the software for realizing functions of the above embodiments to a requester through a communication line for personal-computer communication.

The invention claimed is:

1. A device search system comprising a server unit and a client unit, wherein said client unit comprises:

first request means for requesting said server unit to execute a first search in accordance with first search attributes in order to search for a desired device on the network, the first search attributes including a type attribute indicating a device type and a function attribute indicating a device function of the desired device;

recognition means for recognizing whether result information obtained from the first search executed by said server unit shows a presence or absence of at least one device;

second request means for requesting said server unit to execute a second search in accordance with a second search attribute in order to search for a desired device on the network, in response to a recognition by the recognition means that the result information shows the absence of at least one device, the second attribute being the type attribute extracted from the first search attributes; and output means for outputting, for each device searched in the second search, information indicating a device type corresponding to the second search attribute and information indicating to what extent the device meets the function attribute not extracted for the second search attribute from the first search attributes.

2. The device search system according to claim 1, wherein the output means selectively outputs the search result from the first search or the search result from the second search.

3. The device search system according to claim 1, wherein said client unit further comprises storage means for storing symbol information, including a graphical icon, corresponding to an attribute used for the first search, and when the search result from the second search is outputted and when the information showing a presence or an absence of at least one device found in the first search is outputted, a presence or an absence of at least one device or each attribute of each device is shown in accordance with a display mode of the graphical icon corresponding to each attribute.

4. A system according to claim 1, wherein the second search is executed based on at least one of a color printing attribute, a finishing attribute, and a print layout attribute, and the output means displays on a display unit at least one printer identifier that corresponds to a printer found in the second search.

5. An apparatus for searching a database, which holds information for identifying a device on a network and information of various attributes of the device, said apparatus comprising:

first request means for requesting said server unit to execute a first search in accordance with first search attributes in order to search for a desired device on the network, the first search attributes including a type attribute indicating a device type and a function attribute indicating a device function of the desired device;

recognition means for recognizing whether result information obtained from the first search executed by said server unit shows a presence or absence of at least one device;

second request means for requesting said server unit to execute a second search in accordance with a second search attribute in order to search for a desired device on the network, in response to a recognition by the recognition means that the result information shows the absence of at least one device, the second search attribute being the type attribute extracted from the first search attributes; and output means for outputting, for each device searched in the second search, information indicating a device type corresponding to the second search attribute and information indicating to what extent the device meets the function attribute not extracted for the second search attribute from the first search attributes.

6. The apparatus according to claim 5, further comprising database control means for controlling a search of the database, wherein attributes of a device controlled by the database include an indispensable attribute registered whenever a device is registered in the database and attributes other than the indispensable attribute, and said second request means extracts only the indispensable attribute from the number of attributes used for the first search in order to request the second search.

7. The apparatus according to claim 6, wherein said output means outputs device names and information that shows attributes satisfied by the devices.

8. The apparatus according to claim 6, further comprising storage means for storing symbol information, including a graphical icon, corresponding to an attribute used for the first search, wherein, when the search result from the second search is outputted and when information showing a presence or an absence of at least one device found in the first search is outputted, a presence or an absence of at least one device or each attribute of each device is shown in accordance with a display mode of the graphical icon corresponding to each attribute.

9. The apparatus according to claim 5, wherein said output means selectively outputs the search result from the first search or the search result from the second search.

10. An apparatus according to claim 5, wherein the second search is executed based on at least one of a color printing attribute, a finishing attribute, and a print layout attribute, and said output means displays on a display unit at least one printer identifier that corresponds to a printer found in the second search.

11. An apparatus for searching a database in accordance with a query received from a client unit, said apparatus comprising:

execution means for executing a search in accordance with a search request from the client unit;

database control means for controlling a database in which information for identifying a device on a network and information for various attributes of the device are registered, and for controlling execution of the search for the device in accordance with the search request from the client unit;

reception means for receiving from the client unit a first search for a device which satisfies first search attributes on the network, the first search attributes including a type attribute indicating a device type and a function attribute indicating a device function of the desired device;

recognition means for recognizing whether result information obtained from the first search shows a presence or absence of at least one device;

obtaining means for obtaining a second search attribute for use in a second search from the first search attributes for the first search, the second search attribute being the type attribute extracted from the first search attributes;

search means for executing the second search for a device satisfying the second search attribute obtained by said obtaining means, in response to a recognition by said recognition means that the search result information shows the absence of at least one device; and output means for outputting, for each device searched in the second search, information indicating a device type corresponding to the second search attribute and information indicating to what extent the device meets the function attribute not extracted for the second search attribute from the first search attributes.

12. The apparatus according to claim 11, wherein attributes of a device controlled by the database include an indispensable attribute registered whenever a device is registered in the database and attributes other then the indispensable attribute, and said obtaining means extracts only the indispensable attribute from the first search attributes for the first search for use in the second search.

13. The apparatus according to claim 12, further comprising control means for selecting the search result from the first search or the search result from the second search.

14. The apparatus according to claim 13, wherein said control means returns the search result from the first search to the client unit when a device to be outputted as the search result is present, and returns the search result from the second search to the client unit when a device to be outputted as the search result is not present.

15. An apparatus according to claim 11, wherein the second search is executed based on at least one of a color printing attribute, a finishing attribute, and a print layout attribute, and said output means displays on a display unit at least one printer identifier that corresponds to a printer found in the second search.

16. A method for searching a database, which holds information for identifying a device on a network and information of various attributes of the device, said method comprising:

a first request step of requesting a server unit to execute a first search in accordance with first search attributes in order to search for a desired device on a network, the first search attributes including a type attribute indicating a device type and a function attribute indicating a device function of the desired device;

a recognition step of recognizing whether result information obtained from the first search executed by said server unit shows a presence or absence of at least one device;

a second request step of requesting the server unit to execute a second search in accordance with a second search attribute in order to search for a desired device on the network, in response to a recognition by said recognition means that the result information shows the absence of at least one device, the second search attribute being the type attribute extracted from the first search attributes; and an output step of outputting, for each device searched in the second search, information indicating a device type corresponding to the second search attribute and information indicating to what extent the device meets the function attribute not extracted for the second search attribute from the first search attributes.

17. The method according to claim 16, further comprising a database control step of controlling a search of the database, wherein attributes of a device controlled by the database include an indispensable attribute registered whenever a device is registered in the database and attributes other than the indispensable attribute, and, in said second request step, only the indispensable attribute is extracted from the first search attributes used for the first search in order to request the second search.

18. The method according to claim 17, wherein said output step includes outputting device names and information that shows attributes satisfied by the devices.

19. The method according to claim 17, further comprising a storage step of storing symbol information, including a graphical icon, corresponding to an attribute used for the first search, wherein, when the search result from the second search is outputted and when information showing a presence or an absence of at least one device found in the first search is outputted, a presence or an absence of at least one device or each attribute of each device is shown in accordance with a display mode of the graphical icon corresponding to each attribute.

20. The method according to claim 16, wherein said output step includes selectively outputting the search result from the first search or the search result from the second search.

21. A method according to claim 16, wherein the second search is executed based on at least one of a color printing attribute, a finishing attribute, and a print layout attribute, and said output step outputs to a display unit at least one printer identifier that corresponds to a printer found in the second search.

22. A method for searching a database in accordance with a query received from a client unit, said method comprising:

an execution step of executing a search in accordance with a search request from the client unit;

a database control step of controlling a database in which information for identifying a device on a network and information for various attributes of the device are registered, and for controlling execution of the search for the device in accordance with the search request from the client unit;

a reception step of receiving from the client unit a first search for a device which satisfies first search attributes on the network, the first search attributes including a type attribute indicating a device type and a function attribute indicating a device function of the desired device;

a recognition step of recognizing whether result information obtained from the first search shows a presence or absence of at least one device;

an obtaining step of obtaining a second search attribute for use in a second search from the first search attributes for the first search, the second search attribute being the type attribute extracted from the first search attributes;

a search step of executing the second search for a device satisfying the second search attribute obtained in said obtaining step, in response to a recognition in said recognition step that the search result information shows the absence of at least one device; and an output step of outputting, for each device searched in the second search, information indicating a device type corresponding to the second search attribute and information indicating to what extent the device meets the function attribute not extracted for the second search attribute from the first search attributes.

23. The method according to claim 22, wherein
attributes of a device controlled by the database include an indispensable attribute registered whenever a device is registered in the database and attributes other than the indispensable attribute, and, in said obtaining step, only the indispensable attribute is extracted from the first search attributes for the first search for use in the second search.

24. The method according to claim 23, further comprising a selection step of selecting the search result from the first search or the search result from the second search and returning the selected search result information to the client unit.

25. The method according to claim 24, wherein
the search result from the first search is returned to the client unit when a device to be outputted as the search result is present, and the search result from the second search is returned to the client unit when the device to be outputted as the search result is not present.

26. A method according to claim 22, wherein the second search is executed based on at least one of a color printing attribute, a finishing attribute, and a print layout attribute, and said output step outputs to a display unit at least one printer identifier that corresponds to a printer found in the second search.

27. A storage medium storing a computer program to be executed by a computer to implement a method for searching a database, which holds information for identifying a device on a network and information of various attributes of the device, wherein the method comprises:

a first request step of requesting a server unit to execute a first search in accordance with first search attributes in order to search for a desired device on a network, the first search attributes including a type attribute indicating a device type and a function attribute indicating a device function of the desired device;

a recognition step of recognizing whether result information obtained from the first search executed by said server unit shows a presence or absence of at least one device;

a second request step of requesting the server unit to execute a second search in accordance with a second search attribute in order to search for a desired device on the network, in response to a recognition by said recognition means that the result information shows the absence of at least one device, the second search attribute being the type attribute extracted from the first search attributes; and an output step of outputting, for each device searched in the second search, information indicating a device type corresponding to the second search attribute and information indicating to what extent the device meets the function attribute not extracted for the second search attribute from the first search attributes.

28. A storage medium according to claim 27, wherein the second search is executed based on at least one of a color printing attribute, a finishing attribute, and a print layout attribute, and the output step outputs to a display unit at least one printer identifier that corresponds to a printer found in the second search.

29. A storage medium storing a computer program to be executed by a computer to implement a method for searching a database in accordance with a query received from a client unit, wherein the method comprises:

an execution step of executing a search in accordance with a search request from the client unit;

a database control step of controlling a database in which information for identifying a device on a network and information for various attributes of the device are registered, and for controlling execution of the search for the device in accordance with the search request from the client unit;

a reception step of receiving from the client unit a first search for a device which satisfies first search attributes on the network, the first search attributes including a type attribute indicating a device type and a function attribute indicating a device function of the desired device;

a recognition step of recognizing whether result information obtained from the first search shows a presence or absence of at least one device;

an obtaining step of obtaining a second search attribute for use in a second search from the first search attributes for the first search, the second search attribute being the type attribute extracted from the first search attributes;

a search step of executing the second search for a device satisfying the second search attribute obtained in said obtaining step, in response to a recognition in said recognition step that the search result information shows the absence of at least one device; and an output step of outputting, for each device searched in the second search, information indicating a device type corresponding to the second search attribute and information indicating to what extent the device meets the function attribute not extracted for the second search attribute from the first search attributes.

30. A storage medium according to claim 29, wherein the second search is executed based on at least one of a color printing attribute, a finishing attribute, and a print layout attribute, and the output step outputs to a display unit at least one printer identifier that corresponds to a printer found in the second search.

31. A computer program product embodying a computer program for implementing a method for searching a database, which holds information for identifying a device on a network and information of various attributes of the device, wherein the method comprises:

a first request step of requesting a server unit to execute a first search in accordance with first search attributes in order to search for a desired device on a network, the first search attributes including a type attribute indicating a device type and a function attribute indicating a device function of the desired device;

a recognition step of recognizing whether result information obtained from the first search executed by said server unit shows a presence or absence of at least one device;

a second request step of requesting the server unit to execute a second search in accordance with a second search attribute in order to search for a desired device on the network, in response to a recognition by said recognition means that the result information shows the absence of at least one device, the second search attribute being the type attribute extracted from the first search attributes; and an output step of outputting, for each device searched in the second search, information indicating a device type corresponding to the second search attribute and information indicating to what extent the device meets the function attribute not extracted for the second search attribute from the first search attributes.

32. The program product according to claim 31, wherein the method further comprises a control step of controlling a search of the database, such that attributes of a device controlled by the database include an indispensable attribute registered whenever a device is registered in the database and attributes other than the indispensable attribute, and, in the second request step, only the indispensable attribute is extracted from the first search attributes used for the first search in order to request the second search.

33. The program product according to claim 32, wherein the output step includes outputting device names and information that shows attributes satisfied by the devices.

34. The program product according to claim 32, wherein the method further comprises a storage step of storing symbol information, including a graphical icon, corresponding to an attribute from the second search, wherein, when the search result information under the second condition is outputted and when information showing a presence or an absence of at least one device found in the first search is outputted, a presence or an absence of is shown in accordance with a display mode of the graphical icon corresponding to each attribute.

35. The program product according to claim 31, wherein the output step includes selectively outputting the search result from the first search or the search result from the second search.

36. A program product according to claim 31, wherein the second search is executed based on at least one of a color printing attribute, a finishing attribute, and a print layout attribute, and the output step outputs to a display unit at least one printer identifier that corresponds to a printer found in the second search.

37. A computer program product embodying a computer program for implementing a method for searching a database in accordance with a query received from a client unit, wherein the method comprises:

an execution step of executing a search in accordance with a search request from the client unit;

a database control step of controlling a database in which information for identifying a device on a network and information for various attributes of the device are registered, and for controlling execution of the search for the device in accordance with the search request from the client unit;

a reception step of receiving from the client unit a first search for a device which satisfies first search attributes on the network, the first search attributes including a type attribute indicating a device type and a function attribute indicating a device function of the desired device;

a recognition step of recognizing whether result information obtained from the first search shows a presence or absence of at least one device;

an obtaining step of obtaining a second search attribute for use in a second search from the first search attributes for the first search, the second search attribute being the type attribute extracted from the first search attributes;

a search step of executing the second search for a device satisfying the second search attribute obtained in said obtaining step, in response to a recognition in said recognition step that the search result information shows the absence of at least one device; and an output step of outputting, for each device searched in the second search, information indicating a device type corresponding to the second search attribute and information indicating to what extent the device meets the function attribute not extracted for the second search attribute from the first search attributes.

38. The program product according to claim 37, wherein attributes of a device controlled by the database include
an indispensable attribute registered whenever a device is registered in the database and attributes other than the indispensable attribute, and,
in the obtaining step, only the indispensable attribute is extracted from the first search attributes for the first search for use in the second search.

39. The program product according to claim 38, wherein the method further comprises a selection step of selecting the search result from the first search or the search result from the second search and returning the selected search result information to the client unit.

40. The program product according to claim 39, wherein
the search result from the first search is returned to the client unit when a device to be outputted as the search result is present, and
the search result from the second search is returned to the client unit when the device to be outputted as the search result is not present.

41. A program product according to claim 37, wherein the second search is executed based on at least one of a color printing attribute, a finishing attribute, and a print layout attribute, and the output step outputs to a display unit at least one printer identifier that corresponds to a printer found in the second search.

42. A device search system comprising a server unit and a client unit,
wherein said client unit comprises:
a first request unit adapted to request said server unit to execute a first search in accordance with first search attributes in order to search for a desired device on the network, the first search attributes including a type attribute indicating a device type and a function attribute indicating a device function of the desired device;
a recognition unit adapted to recognize whether result information obtained from the first search executed by said server unit shows a presence or absence of at least one device;
a second request unit adapted to request said server unit to execute a second search in accordance with a second search attribute in order to search for a desired device on the network, in response to a recognition by the recognition means that the result information shows the absence of at least one device, the second search attribute being the type attribute extracted from the first search attributes; and
an output unit adapted to output, for each device searched in the second search, information indicating a device type corresponding to the second search attribute and information indicating to what extent the device meets the function attribute not extracted for the second search attribute from the first search attributes.

43. An apparatus for searching a database, which holds information for identifying a device on a network and information of various attributes of the device, said apparatus comprising:
a first request unit adapted to request said server unit to execute a first search in accordance with first search attributes in order to search for a desired device on the network, the first search attributes including a type attribute indicating a device type and a function attribute indicating a device function of the desired device;
a recognition unit adapted to recognize whether result information obtained from the first search executed by said server unit shows a presence or absence of at least one device;
a second request unit adapted to request said server unit to execute a second search in accordance with a second search attribute in order to search for a desired device on the network, in response to a recognition by the recognition means that the result information shows the absence of at least one device, the second search attribute being the type attribute extracted from the first search attributes; and
an output unit adapted to output, for each device searched in the second search, information indicating a device type corresponding to the second search attribute and information indicating to what extent the device meets the function attribute not extracted for the second search attribute from the first search attributes.

44. An apparatus for searching a database in accordance with a query received from a client unit, said apparatus comprising:
an execution unit adapted to execute a search in accordance with a search request from the client unit;
a database control unit adapted to control a database in which information for identifying a device on a network and information for various attributes of the device are registered, and for controlling execution of the search for the device in accordance with the search request from the client unit;
a reception unit adapted to receive from the client unit a first search for a device which satisfies first search attributes on the network, the first search attributes including a type attribute indicating a device type and a function attribute indicating a device function of the desired device;
a recognition unit adapted to recognize whether result information obtained from the first search shows a presence or absence of at least one device;
an obtaining unit adapted to obtain a second search attribute for use in a second search from the first search attributes for the first search, the second search attribute being the type attribute extracted from the first search attributes;

a search unit adapted to execute the second search for a device satisfying the second search attribute obtained by said obtaining means, in response to a recognition by said recognition means that the search result information shows the absence of at least one device; and an output unit adapted to output, for each device searched in the second search, information indicating a device type corresponding to the second search attribute and information indicating to what extent the device meets the function attribute not extracted for the second search attribute from the first search attributes.

45. A device search apparatus comprising:
a first display unit, adapted to display result information obtained from a device search executed under a first search condition in which first search attributes are designated, the first search attributes including a type attribute indicating a device type and a function attribute indicating a device function of the desired device;
an extraction unit, adapted to extract the type attribute from the first search attributes designated in the first search condition for use as a second search condition;
a request unit, adapted to request a device search under the second search condition; and
a second display unit, adapted to display, for each device completely meeting the second search condition, information indicating a device type corresponding to the type attribute used as the second search condition and information indicating to what extent the device meets the function attribute not extracted for use as the second search attribute from the first search attributes.

46. An apparatus according to claim 45, wherein the number of attributes designated in the first search condition include an indispensable attribute and an optional attribute, and an attribute extracted by said extraction unit for the second search condition are defined as an indispensable attribute.

47. An apparatus according to claim 45, further comprising a recognition unit, adapted to recognize whether at least one device that meets the first search condition has been found, wherein said extraction unit extracts a part of the number of attributes designated in the first search condition in response to a recognition result by said recognition unit.

48. An apparatus according to claim 45, wherein devices found in the device search under the first and second search conditions are displayed distinguishably from each other.

49. A device search method comprising:
a first display step of displaying result information obtained from a device search executed under a first search condition in which first search attributes are designated, the first search attributes including a type attribute indicating a device type and a function attribute indicating a device function of the desired device;
an extraction step of extracting the type attribute from the first search attributes designated in the first search condition for use as a second search condition;
a request step of requesting a device search under the second search condition; and
a second display step of displaying, for each device completely meeting the second search condition, information indicating a device type corresponding to the type attribute used as the second search condition and information indicating to what extent the device meets the function attribute not extracted for use as the second search attribute from the first search attributes.

50. A method according to claim 49, wherein the first search attributes designated in the first search condition include an indispensable attribute and an optional attribute, and the attribute extracted by said extraction unit for the second search condition is defined as an indispensable attribute.

51. A method according to claim 49, further comprising a recognition step of recognizing whether at least one device that meets the first search condition has been found, wherein said extraction step includes extracting a part of the number of attributes designated in the first search condition in response to a recognition result in said recognition step.

52. A method according to claim 49, wherein devices found in the device search under the first and second search conditions are displayed distinguishably from each other.

53. A computer-readable storage medium storing a program for implementing a device search method, wherein the method comprises:
a first display step of displaying result information obtained from a device search executed under a first search condition in which first search attributes are designated, the first search attributes including a type attribute indicating a device type and a function attribute indicating a device function of the desired device;
an extraction step of extracting the type attribute from the first search attributes designated in the first search condition for use as a second search condition;
a request step of requesting a device search under the second search condition; and
a second display step of displaying, for each device completely meeting the second search condition, information indicating a device type corresponding to the type attribute used as the second search condition and information indicating to what extent the device meets the function attribute not extracted for use as the second search attribute from the first search attributes.

54. A computer program product embodying a program for implementing a device search method, wherein the method comprises:
a first display step of displaying result information obtained from a device search executed under a first search condition in which first search attributes are designated, the first search attributes including a type attribute indicating a device type and a function attribute indicating a device function of the desired device;
an extraction step of extracting the type attribute from the first search attributes designated in the first search condition for use as a second search condition;
a request step of requesting a device search under the second search condition; and
a second display step of displaying, for each device completely meeting the second search condition, information indicating a device type corresponding to the type attribute used as the second search condition and information indicating to what extent the device meets the function attribute not extracted for use as the second search attribute from the first search attributes.

\* \* \* \* \*

UNITED STATES PATENT AND TRADEMARK OFFICE
CERTIFICATE OF CORRECTION

PATENT NO. : 7,085,763 B2
APPLICATION NO. : 09/552589
DATED : August 1, 2006
INVENTOR(S) : Masato Ochiai et al.

It is certified that error appears in the above-identified patent and that said Letters Patent is hereby corrected as shown below:

ON COVER PAGE AT (56) OTHER PUBLICATIONS

After "Doan, Khoa et al.": "Systmes," should read --Systems,--; and
(On page 2) "Susan Gauch ," should read --Susan Gauch,--.

ON COVER PAGE AT (56) U.S. PATENT DOCUMENTS

Insert:
| | | | |
|---|---|---|---|
| --US-5,671,404 | 09-1997 | Lizee et al. | 707/5 |
| US-5,760,775 | 06-1998 | Sklut et al. | 345/839 |
| US-6,070,000 | 05-2000 | Mori, Hiromi | 358/1.15 |
| US-5,903,894 | 05/1999 | Reneris, Kenneth S. | 707/100 |
| US-2003/0191759 | 10-2003 | Harvey, Richard Hans | 70/74 |
| US-6,604,127 | 08-2003 | Murphy et al. | 709/203 |
| US-5,708,804 | 01-1998 | Goodwin et al. | 707/3 |
| US-6,581,097 | 06-2003 | Lynch et al. | 709/226--. |

ON COVER PAGE AT (56) FOREIGN PATENT DOCUMENTS

"05028088 A" should read --05-028088 A--;
"07302267 A" should read --07-302267 A--; and
"11346216 A" should read --11-346216 A--.

ON COVER PAGE AT (57) ABSTRACT

Line 2, "understand" should read --identify--.

SHEET 18

FIG. 19, "FIX" should read --FIXED--.

COLUMN 1

Line 15, "is" should read --are--.

COLUMN 2

Line 2, "device" (first occurrence) should read --a device--; and
Line 24, "FIGS. 13, 14, 15" should read --FIGS. 13, 14, and 15--.

UNITED STATES PATENT AND TRADEMARK OFFICE
CERTIFICATE OF CORRECTION

PATENT NO.        : 7,085,763 B2
APPLICATION NO.   : 09/552589
DATED             : August 1, 2006
INVENTOR(S)       : Masato Ochiai et al.

It is certified that error appears in the above-identified patent and that said Letters Patent is hereby corrected as shown below:

COLUMN 3

Line 63, "stable" should read --staple--.

COLUMN 4

Line 1, "example to" should read --example of--; and
    Line 51, "gain" should read --again--.

COLUMN 5

Line 24, "function," should read --function 805,--; and "function" should read --function 806--; and
    Line 52, "absence" should read --absence of--.

COLUMN 6

Line 8, "stable" should read --staple--.

COLUMN 7

Line 6, "IN" should read --In--;
    Line 14, "other" should read --another--;
    Line 23, "step S110" should read --step S1102--;
    Line 33, "step 1104," should read --step S1104,--;
    Line 36, "fExit" should read --fExist--; and
    Line 42, "FIG. 8" should read --FIG. 8)--.

COLUMN 8

Line 8, "fExit" should read --fExist--; and "In" should read --in--;
    Line 9, "fExit" should read --fExist--; and "S1108," should read --step S1108,--; and
    Line 20, "designate" should read --designated--

COLUMN 9

Line 38, "even" should read --event--; and
    Line 54, "stars" should read --starts--.

UNITED STATES PATENT AND TRADEMARK OFFICE
CERTIFICATE OF CORRECTION

PATENT NO. : 7,085,763 B2
APPLICATION NO. : 09/552589
DATED : August 1, 2006
INVENTOR(S) : Masato Ochiai et al.

It is certified that error appears in the above-identified patent and that said Letters Patent is hereby corrected as shown below:

COLUMN 10

Line 22, "However," should read --However, if--;
Line 27, "data base 300" should read --database 300--; and
Line 64, "n" should read --in--.

COLUMN 11

Line 62, "output," should read --output (1703e),--.

COLUMN 12

Line 14, "stable," should read --staple,--;
Line 17, "ions" should read --icons--;
Line 26, "search" should read --searched--; and
Line 55, "matched" should read --matched with--.

COLUMN 13

Line 3, "matched" should read --matched with--;
Line 24, "an" should read --can--; and
Line 40, "n" should read --in--.

COLUMN 16

Line 36, "then" should read --than--.

UNITED STATES PATENT AND TRADEMARK OFFICE
CERTIFICATE OF CORRECTION

PATENT NO. : 7,085,763 B2
APPLICATION NO. : 09/552589
DATED : August 1, 2006
INVENTOR(S) : Masato Ochiai et al.

It is certified that error appears in the above-identified patent and that said Letters Patent is hereby corrected as shown below:

COLUMN 20

Line 42, "of is" should read --of at least one device or each attribute of each device is--.

Signed and Sealed this

Thirteenth Day of February, 2007

JON W. DUDAS
*Director of the United States Patent and Trademark Office*